US006993159B1

(12) United States Patent
Ishii et al.

(10) Patent No.: US 6,993,159 B1
(45) Date of Patent: Jan. 31, 2006

(54) DRIVING SUPPORT SYSTEM

(75) Inventors: Hirofumi Ishii, Kanagawa (JP);
Atsushi Morimura, Nara (JP);
Masamichi Nakagawa, Osaka (JP);
Shusaku Okamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 545 days.

(21) Appl. No.: 10/088,593

(22) PCT Filed: Sep. 20, 2000

(86) PCT No.: PCT/JP00/06393

§ 371 (c)(1),
(2), (4) Date: Mar. 19, 2002

(87) PCT Pub. No.: WO01/21446

PCT Pub. Date: Mar. 29, 2001

(30) Foreign Application Priority Data

Sep. 20, 1999 (JP) .................................. 11/265629

(51) Int. Cl.
*G06K 9/00* (2006.01)
*G06T 17/00* (2006.01)
(52) U.S. Cl. ....................... 382/104; 382/154; 345/419
(58) Field of Classification Search ................ 382/106, 382/107, 275
See application file for complete search history.

(56) References Cited

U.S. PATENT DOCUMENTS

| 5,670,935 | A | | 9/1997 | Schofield et al. |
| 5,886,744 | A | * | 3/1999 | Hannah ................. 375/240.16 |
| 6,118,475 | A | * | 9/2000 | Iijima et al. .................. 348/42 |
| 6,477,260 | B1 | * | 11/2002 | Shimomura ................. 382/106 |
| 6,674,430 | B1 | * | 1/2004 | Kaufman et al. ........... 345/419 |
| 6,728,417 | B1 | * | 4/2004 | Hara et al. .................. 382/275 |

FOREIGN PATENT DOCUMENTS

| DE | 2215576 | 10/1973 |
| DE | 3637165 A1 | 5/1988 |
| GB | 1408078 | 10/1975 |
| JP | 48-51444 | 7/1973 |
| JP | 06-333200 | 12/1994 |
| JP | 07-017328 | 1/1995 |
| JP | 07093693 | 4/1995 |
| JP | 07-186833 | 7/1995 |
| JP | 09-086314 | 3/1997 |
| JP | 09223227 | 8/1997 |
| JP | 9-249083 | 9/1997 |
| JP | 0940397 | 9/1997 |

(Continued)

OTHER PUBLICATIONS

Partial European Search Report mailed Oct. 22, 2002.

(Continued)

*Primary Examiner*—Daniel Miriam
*Assistant Examiner*—O'Neal R. Mistry
(74) *Attorney, Agent, or Firm*—Harness, Dickey & Pierce, P.L.C.

(57) ABSTRACT

A driving support system for enabling a driver to appropriately confirm environmental conditions of a moving body is provided. A plurality of imaging means for taking an image of the rear of the moving body is installed on the moving body. The plurality of imaging means have an area (OL) where their imaging areas overlap with each other, and the overlap area (OL) includes an area in the vicinity of a vanishing point (VP). Detection means obtains a stereo parallax (VD) between one imaging means and another imaging means in the overlap area (OL), and obtains a distance to an object based on the stereo parallax (VD).

8 Claims, 24 Drawing Sheets

FOREIGN PATENT DOCUMENTS

| | | |
|---|---|---|
| JP | 10038561 | 2/1998 |
| JP | 10-341430 | 12/1998 |
| JP | 11020546 | 1/1999 |
| JP | 11042989 | 2/1999 |
| JP | 22042988 | 2/1999 |
| JP | 11-213295 | 8/1999 |
| JP | 2000-113164 | 4/2000 |
| JP | 2000-207693 | 7/2000 |
| JP | 2000-242797 | 9/2000 |

OTHER PUBLICATIONS

Notice of Reasons of Rejection for Japanese Patent App. No. 2002-046169; Mailed: Dec. 14, 2004; and English translation thereof.

International Search Report, PCT/JP00/06393, Japanese Patent Office, Dec. 19, 2000.

* cited by examiner

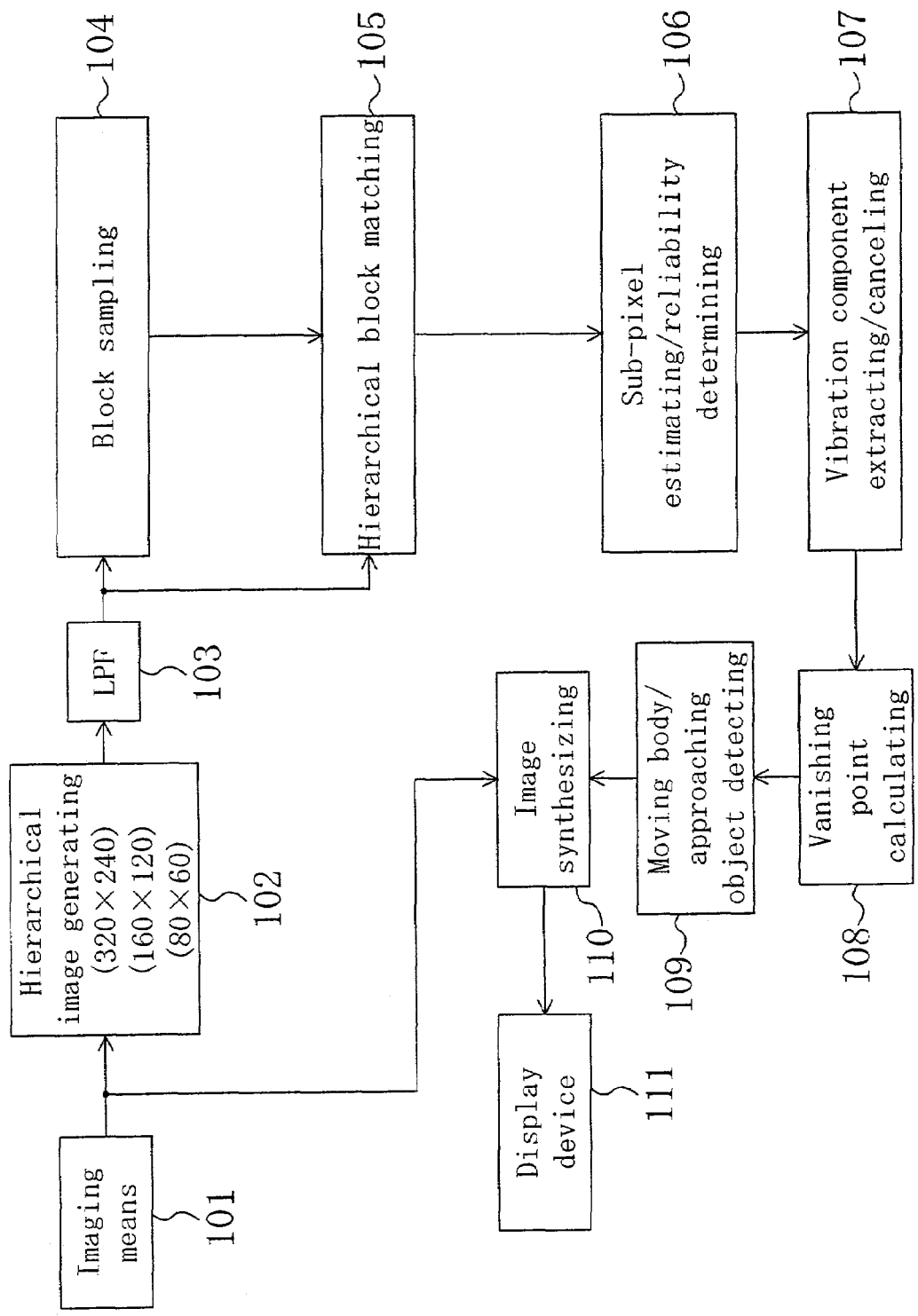

Left image
(taken by 401)

Right image
(taken by 101)

101

VVP

DRIVING SUPPORT SYSTEM

This application is a 371 of PCT/JP00/06393 filed on Sep. 20, 2000.

TECHNICAL FIELD

The present invention relates to a driving support system for supporting driving of a moving body such as a vehicle by taking an image of environmental conditions of the moving body with a camera and processing camera imagery.

BACKGROUND ART

In respect of a conventional driving support system using a camera, detection of an obstacle or an approaching vehicle is disclosed in, for example, Japanese Laid-Open Patent Publication Nos. 9-240397 and 7-93693.

Japanese Laid-Open Patent Publication No. 9-240397 (hereinafter referred to as "the first conventional example") discloses an annunciator for a vehicle running at the side rear. This annunciator detects, on the basis of a camera image taken in the side rear region of the self-vehicle, a moving body present in an adjacent lane and also detects whether or not a white line is present in detecting a moving body, so as to detect another vehicle by integrating the results of these detection. Thus, closeness between the self-vehicle and another vehicle is judged, so that a driver can be informed when there is a possibility of excessive closeness.

Alternatively, Japanese Laid-Open Patent Publication No. 7-93693 (hereinafter referred to as "the second conventional example") discloses an object detector for a vehicle. This is an object detector for a vehicle capable of correctly distinguishing an object such as a vehicle from a figure or pattern drawn on the road so as to accurately detect the object. As a characteristic of the structure, the movement of an edge point of an object in an image is measured by apparent travel speed measuring means as if it were three-dimensional movement on the road and the measured movement and the speed of the vehicle is compared by object judgment means so as to discriminate the object.

PROBLEMS TO BE SOLVED BY THE INVENTION

However, the aforementioned conventional techniques have the following problems:

First, in the second conventional example, the method for detecting an obstacle through movement analysis of a camera image is a method generally designated as motion stereo, in which change of an image in accordance with change of a visual point through movement is analyzed so as to obtain three-dimensional information of the camera image. This method, however, has a problem that the change of the image in accordance with the change of the visual point is small in a camera image taken in a moving direction. When this method is applied to, for example, a vehicle, there arises a problem that the sensitivity of the detection is lowered when an object is closer to the forward or backward region along the moving direction.

Furthermore, since the technique of movement analysis is used for obtaining the movement of an object on a screen, when the imaging device is installed on a vehicle, the screen is vibrated due to jolt of the vehicle, and hence, the movement cannot be accurately obtained.

Moreover, when an approaching object is detected, it is significant how the driver is informed of the approaching object. In the case where an alarm sound or the like is used, the alarm sound may surprise the driver, which may cause a mistake in the driving. Also, error detection of an approaching object may obstacle safe driving of the driver. Thus, it is a significant problem how the driver is informed of an approaching object. In respect to a warning to the driver, the first conventional example merely describes that the driver is informed of excessive closeness. In the second conventional example, no description is made on the method for informing the driver of a detected obstacle.

DISCLOSURE OF THE INVENTION

In consideration of such problems of the conventional driving support system or moving body image display system, an object of the invention is providing a driving support system in which a driver can directly confirm environmental conditions such as an approaching object and an obstacle so as to reduce burdens of the driver.

Specifically, the system for supporting driving of a moving body of this invention comprises a plurality of imaging means installed on the moving body for taking camera images of the rear of the moving body; and detection means for detecting movement of an object present in the rear of the moving body based on the camera images of the plurality of imaging means, and the plurality of imaging means have, in camera images thereof, an overlap area that includes an area in the vicinity of a vanishing point and in which imaging areas of first imaging means and second imaging means overlap with each other, and the detection means obtains a stereo parallax between the first imaging means and the second imaging means in the overlap area, and obtains a distance to the object on the basis of the obtained stereo parallax.

The detection means of the driving support system of this invention preferably detects flows corresponding to movement with time of an image in the imaging area of the first imaging means excluding the overlap area, and detects movement of the object present in the rear of the moving body on the basis of the detected flows.

The driving supporting system of this invention preferably further comprises image synthesizing means for generating an image representing the rear of the moving body through image synthesis using the camera images of the plurality of imaging means.

Also the driving supporting system of this invention preferably further comprises danger level determining means for determining a possibility of collision of the moving body with an approaching object from the rear of the moving body on the basis of information output from the detection means and for outputting an indicator signal when it is determined that there is a strong possibility of the collision; and external warning means for providing a warning to the rear of the moving body when the indicator signal is output from the danger level determining means. Alternatively, it preferably comprises danger level determining means for determining a possibility of collision of the moving body with an approaching object from the rear of the moving body on the basis of information output from the detection means and for outputting an indicator signal when it is determined that there is a strong possibility of the collision; and passenger protecting means for taking measure to protect a passenger of the moving body when the indicator signal is output from the danger level determining means.

Moreover, another system for supporting driving of a moving body of this invention comprises imaging means installed on the moving body for taking a camera image of a surrounding region of the moving body; image generating means for converting the camera image of the imaging means into an image seen from a visual point positioned differently from the imaging means; and detecting means for detecting a distance from the moving body to an object imaged in the camera image, and the image generating means corrects distortion of an image of the object by using the distance detected by the detection means in converting the image.

Preferably, in this driving supporting system, the imaging means is plural in number, the plural imaging means have, in camera images thereof, an overlap area in which imaging areas of first imaging means and second imaging means overlap with each other, and the detection means obtains a stereo parallax between the first imaging means and the second imaging means in the overlap area, and obtains a distance to the object on the basis of the obtained stereo parallax.

Furthermore, the detection means of this driving support system preferably obtains a distance to the object on the basis of flows corresponding to movement with time of the camera image.

Still another system for supporting driving of a moving body of this invention comprises imaging means installed on the moving body for taking a camera image of a surrounding region of the moving body; and detection means for obtaining flows corresponding to movement with time on the basis of the camera image of the imaging means and for detecting movement of an object present in the surrounding region of the moving body on the basis of the flows, and the detection means obtains, as preparation for detecting the movement of the object, an offset estimated value from each of the obtained flows and cancels the offset estimated value from each of the flows as a vibration component derived from jolt of the moving body.

BRIEF DESCRIPTION OF DRAWINGS

FIG. 1 is a block diagram for showing the structure of a driving support system according to Embodiment 1 of the invention.

BEST MODE FOR CARRYING OUT THE INVENTION

Figure 2A:
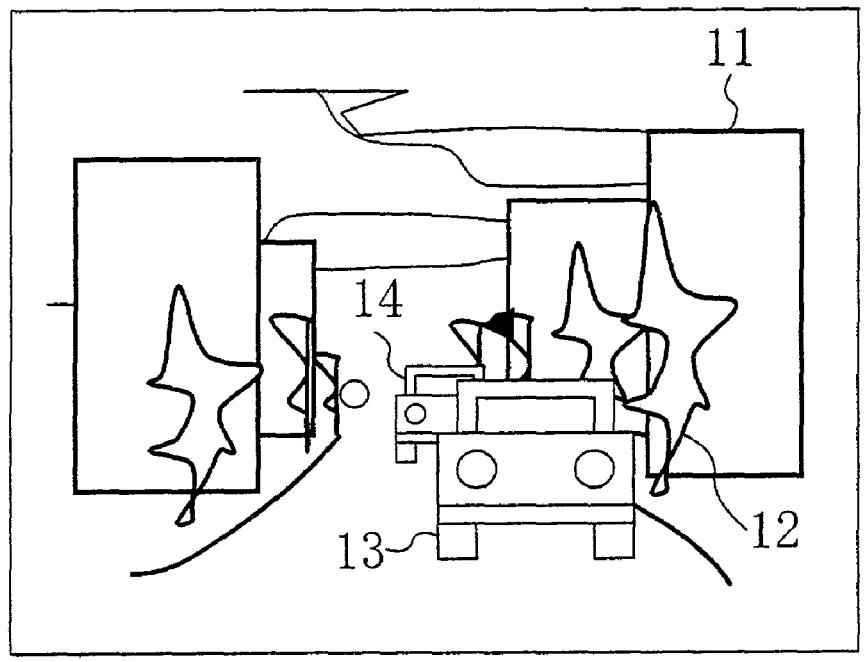
FIG. 2A is a diagram of an exemplified camera image and FIG. 2B is a diagram in which flows are shown on the image of FIG. 2A.

Preferred embodiments of the invention will now be described with reference to the accompanying drawings.

Embodiment 1

FIG. 1 is a block diagram for showing the structure of a driving support system (moving body image display system) according to Embodiment 1 of the invention. In FIG. 1, a reference numeral 101 denotes imaging means provided on a moving body, a reference numeral 102 denotes hierarchical image generating means, a reference numeral 103 denotes an LPF (low-pass filter), a reference numeral 104 denotes block sampling means, a reference numeral 105 denotes hierarchical block matching means, a reference numeral 106 denotes sub-pixel estimating/reliability determining means, a reference numeral 107 denotes vibration component extracting/canceling means, a reference numeral 108 denotes vanishing point calculating means, a reference numeral 109 denotes moving body/approaching object detecting means, a reference numeral 110 denotes image synthesizing means, and a reference numeral 111 denotes a display device. The composing elements 102 through 109 together form detection means.

The imaging means 101 is, for example, a camera, and is provided on a rear portion, for example, on a rear panel of a vehicle so that an image of the rear of the vehicle can be taken. As the display device 111, a display dedicated to this system or a liquid crystal monitor for car navigation may be used.

The object of the moving body image display system of this embodiment is mainly reducing burdens of a driver by directly and comprehensively warning and displaying an object approaching from the rear that can be a danger in changing the driving course. The operation of the moving body image display system of this embodiment will now be described with reference to FIGS. 2 through 13.

First, the imaging means 101 takes an image (herein of 320 pixels×240 pixels) of the rear of the self-vehicle as shown in FIG. 2A. This camera image includes obstacles such as a building 11 and a roadside tree 12 and moving bodies such as other vehicles 13 and 14 running behind. In FIG. 2, these obstacles and moving bodies are schematically expressed. This camera image is input to the hierarchical image generating means 102 and the image synthesizing means 110.

The hierarchical image generating means 102 generates a primary upper image (of 160×120 pixels) by adding each of 2×2 pixels of the input image. Furthermore, a secondary upper image (of 80×60 pixels) is similarly generated from the primary upper image. These three kinds of images are output to the LPF 103 as hierarchical images. The LPF 103 conducts LPF processing for 3×3 pixels on each of the input hierarchical images.

The block sampling means 104 divides each of the hierarchical images into blocks each of 8×8 pixels, and sub-samples each block at 16 (=4×4) representing points selected every 2 pixels.

The hierarchical block matching means 105 obtains, from the image of the upper hierarchy, an SAD (a sum of absolute differences) through block matching in a range of 5×5 pixels, and further obtains a motion vector on the basis of a point where the SAD is minimum. With respect to a block of the image of the lower hierarchy, a motion vector is further obtained in a range of 5×5 pixels with a motion vector obtained in a block of the higher hierarchy disposed in the same position as the center.

The sub-pixel estimating/reliability determining means 106 estimates, by using the motion vector obtained in the image of the lowest hierarchy (camera image) and the SAD, a motion vector at accuracy of a sub-pixel with one or less pixel on the basis of values of the SAD at the SAD minimum point and eight points around the SAD minimum point. Also, the sub-pixel estimating/reliability determining means 106 determines the reliability of the motion vector in the block.

Figure 2B:
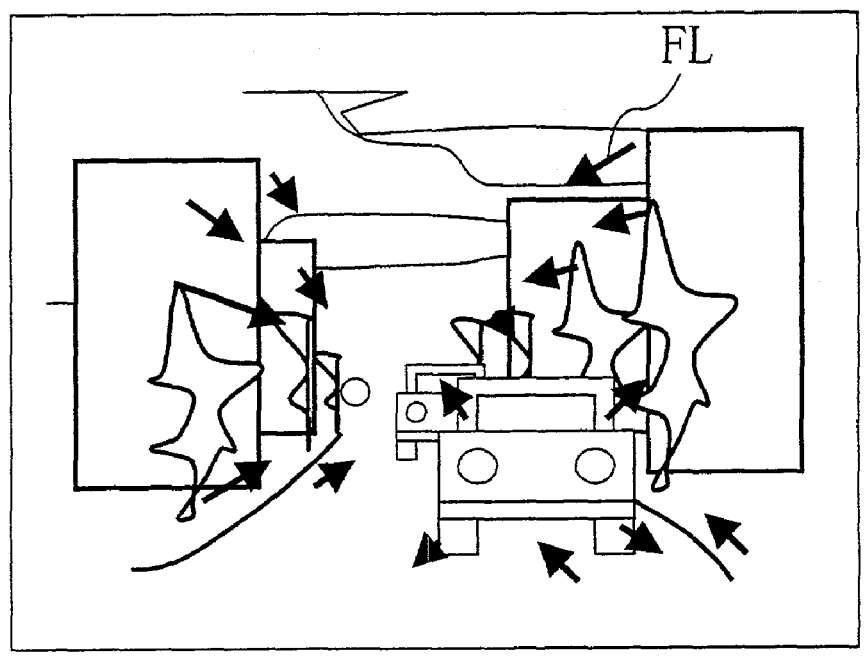

Through these processing by the hierarchical block matching means 105 and the sub-pixel estimating/reliability determining means 106, motion vectors corresponding to movement from a previous frame at respective points in the camera image are obtained as flows FL as shown in FIG. 2B.

Figure 3:
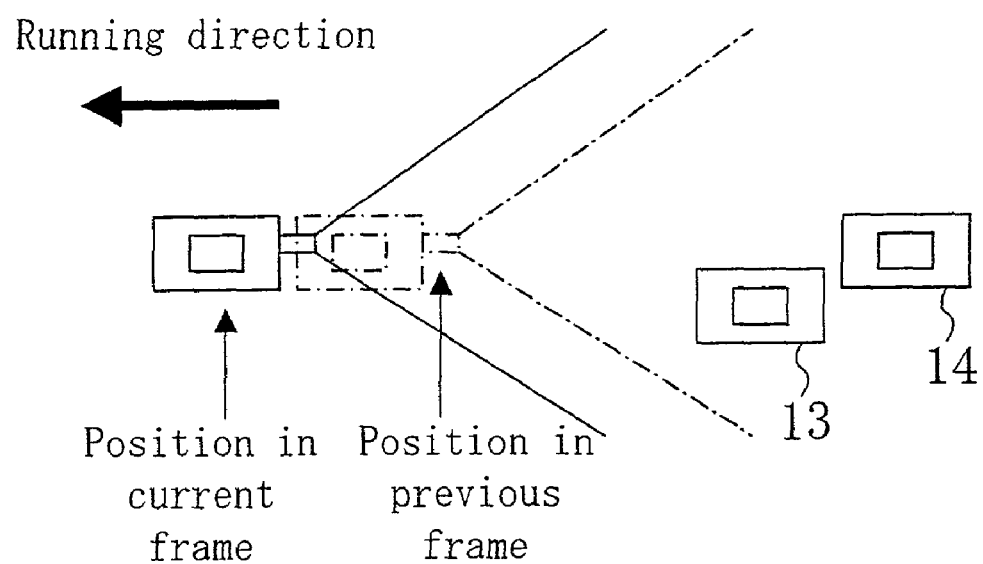
FIG. 3 is a conceptual diagram seen from above of conditions under which the image of FIG. 2A is taken.

The flows FL in the camera image will now be described with reference to FIG. 3. As shown in FIG. 2B, the aforementioned flows FL are obtained at edge portions of the image. At this point, after canceling the vibration of the camera, a direction reverse to the running direction of the vehicle of FIG. 3 corresponds to a vanishing point VP on the screen shown in FIG. 4A. An object standing still on the ground has a flow FL directing toward the vanishing point VP on the screen. Accordingly, an area on the screen having a flow FL not directing to the vanishing point VP (such as a rectangular area 202) can be extracted as a moving body or an approaching object.

Figure 4A:
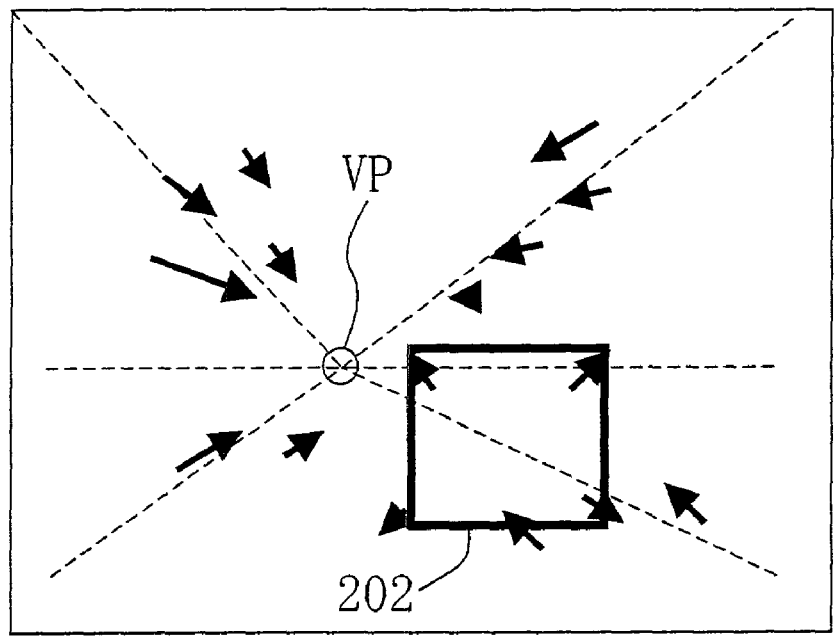
FIG. 4A is a diagram for showing the relationship between a vanishing point and flows and FIG. 4B is a diagram of a moving body area extracted from the image of FIG. 2A.

Furthermore, the vibration component extracting/canceling means 107 extracts and cancels a vibration component caused by the jolt of the vehicle by integrally processing the obtained motion vectors. In this invention, since a vibration component of the image is extracted by using the motion vectors obtained for detecting an approaching object, there is no need to separately detect a vibration component of the entire image for vibration correction. The vanishing point calculating means 108 obtains the vanishing point VP of the flows FL of the image accompanied by the movement of the car. Specifically, as shown in FIG. 4A, the vanishing point VP is obtained as a point to which most of the points on the entire image direct.

Figure 4B:
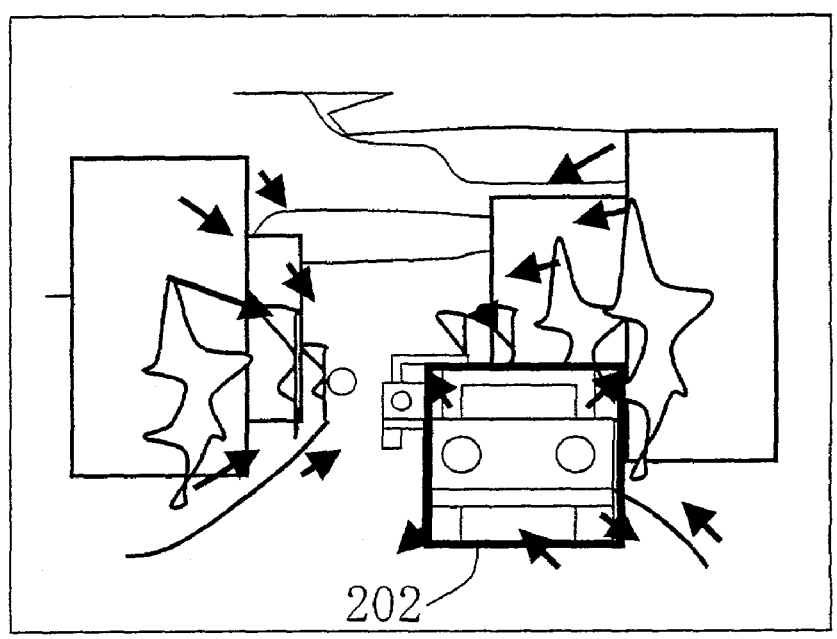

The moving body/approaching object detecting means 109 extracts, as a moving body/approaching object candidate block, a block having a motion vector different from the flow FL directing to the vanishing point VP obtained by the vanishing point calculating means 108. Furthermore, moving body/approaching object candidate blocks close to one another are linked, so that an area where the moving body/approaching object is present like a rectangular area 202 can be extracted as a moving body as shown in FIG. 4B.

Figure 5:
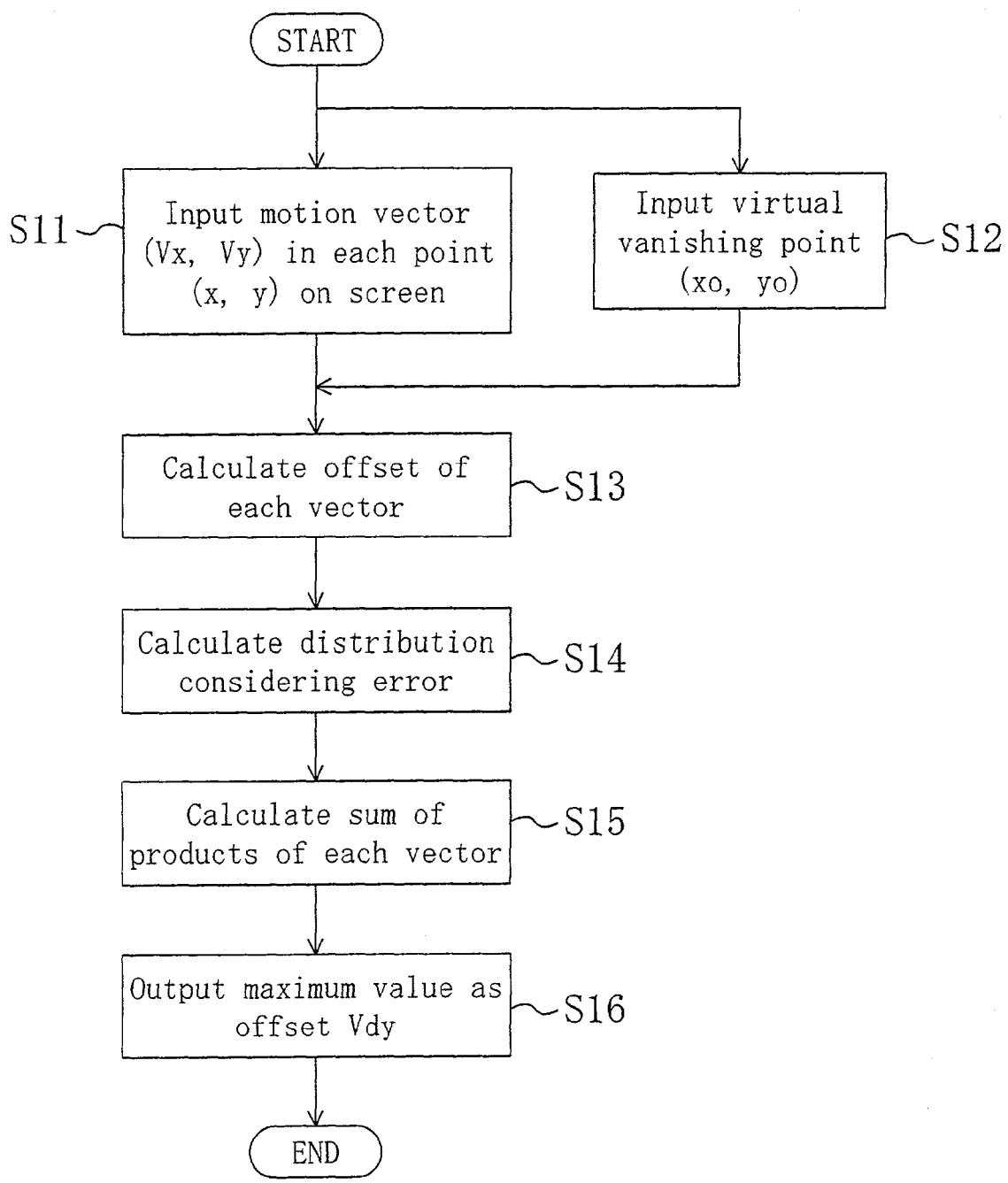
FIG. 5 is a flowchart for showing procedures of vibration component extraction.

Now, the specific operation of the vibration component extracting/canceling means 107 will be described with reference to FIGS. 5 through 7. FIG. 5 is a flowchart for explaining the operation.

A vehicle not only moves in the running direction but also jolts in the vertical direction owing to the influence of bumps of the road and the like. As shown in FIG. 6, the influence of the vertical jolt of the vehicle on the imaging means appears as a positional change as shown in FIG. 6A and an imaging direction change as shown in FIG. 6B.

Figure 6A:
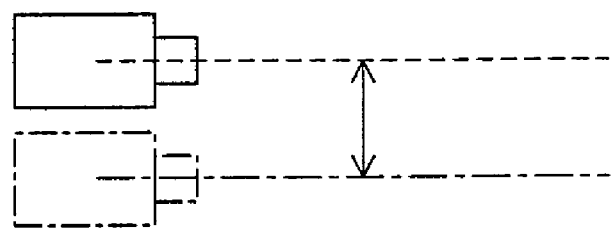
FIGS. 6A and 6B are diagrams of influence of vertical vibration of a vehicle on imaging means.
Figure 6B:
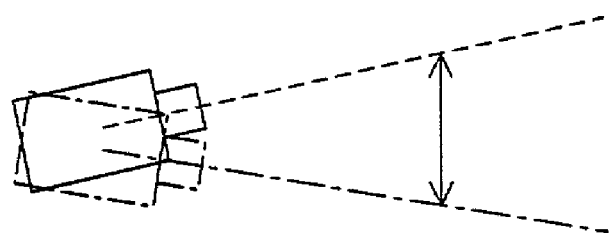

The vertical positional change as shown in FIG. 6A is very small as compared with a positional change along the running direction of the vehicle because the frame gap of an image signal is very small. Also, a change of the position of the imaging means is largely varied in its influence depending upon the distance to an object, and largely affects a close object but minimally affects a far object. The distance to a rear object monitored in this embodiment is several meters through several tens meters, which is sufficiently far. Accordingly, in this case, the imaging direction change shown in FIG. 6B alone is considered without considering the influence of the vertical positional change.

The imaging direction change is not varied in its influence depending upon the distance to an object, and when the angle of the change is very small, it can be assumed as a vertical offset Vdy, which is constant in the entire screen, with respect to each motion vector on the screen. In this case, a motion vector (Vx, Vy) in still background excluding a moving body can be approximated to a sum of a motion vector (V0x, V0y) directed to the vanishing point VP derived from the movement of the vehicle and the offset (0, Vdy) as shown in the following formulas:

$$Vx = V0x$$

$$Vy = V0y + Vdy$$

In the flowchart of FIG. 5, the offset (0, Vdy) is extracted as the vibration component, so as to be cancelled from the detected motion vector (Vx, Vy). Thus, the motion vector (V0x, V0y) directed toward the vanishing point VP is obtained in the still background portion.

First, with respect to each point (x, y) on the screen, a motion vector (Vx, Vy) is input (S11). At this point, with respect to a uniform area where there is no figure, such as the sky, motion vectors are previously excluded because of lack of the reliability thereof, and motion vectors with reliability alone are input. Also, a virtual vanishing point (x0, y0) obtained by assuming that the vehicle runs straight forward can be previously obtained because it can be determined on a predetermined point on the screen on the basis of the installation angle of the imaging means 101 (S12).

Next, with respect to each motion vector, the offset is calculated (S13). In the case where the point (x, y) is positioned in the still background portion, the following relationships hold:

$$(x-x0)*V0y=(y-y0)*Vx$$

$$(x-x0)*(Vy-Vdy)=(y-y0)*Vx$$

On the basis of these relationships, Vdy is obtained as follows:

$$Vdy=Vy-(y-y0)*Vx/(x-x0)$$

On the basis of this formula, Vdy can be obtained from one motion vector. However, the input motion vectors include a large number of motion vectors with regard to image areas apart form the still background portion such as a moving body. Also, a motion vector with regard to the still background portion includes an error. Therefore, the offset Vdy of the motion vector is estimated through statistical processing. Specifically, as shown in FIG. 7, with respect to each motion vector, Vdy is obtained in accordance with the aforementioned formula, and the frequency of each Vdy is calculated, so that Vdy with the highest frequency can be determined as an ultimate offset estimated value (S14, S15 and S16).

Figure 7A:
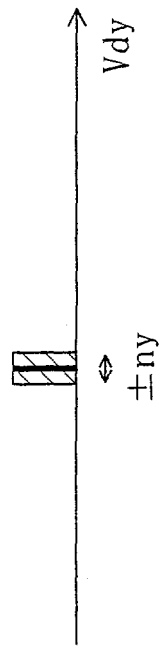
FIGS. 7A through 7G are diagrams for explaining procedures for obtaining an offset estimated value of a motion vector.
Figure 7B:
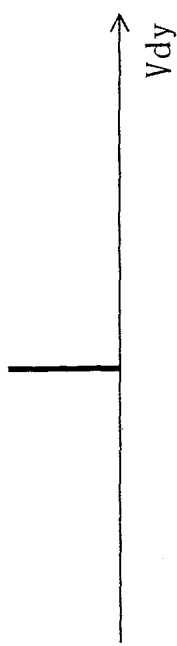
Figure 7C:
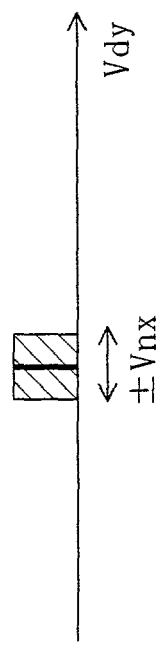
Figure 7D:
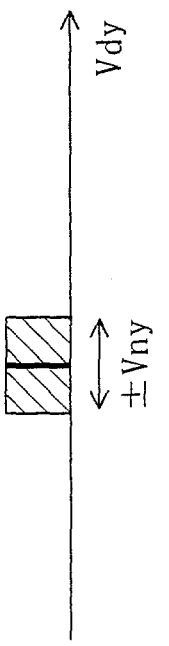
Figure 7E:
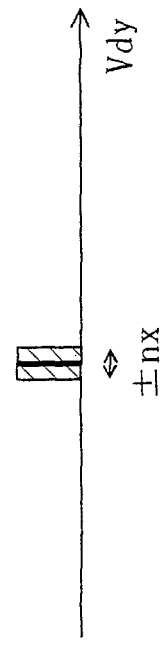

First, an error (±Vnx, ±Vny) is assumed with respect to one motion vector, and a small error (±nx, ±ny) is assumed with respect to the position on the screen. It is herein assumed that the offset Vdy is obtained with respect to one motion vector as shown in FIG. 7A. When the error (±Vnx, ±Vny) of the motion vector is considered with respect to this offset, distributions as shown in FIGS. 7B and 7C are obtained, and when the small error (±nx, ±ny) of the position on the screen is considered, distributions as shown in FIGS. 7D and 7E are obtained. Through convolution integral of the distributions of FIGS. 7B through 7E, a distribution as shown in FIG. 7F can be obtained.

Figure 7F:
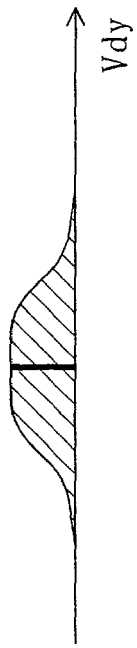
Figure 7G:
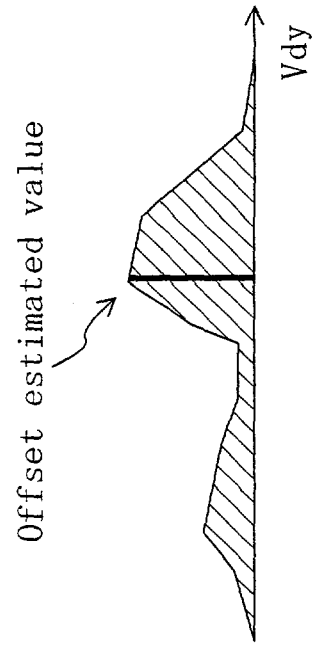

As a sum of products of distributions like that of FIG. 7F of the motion vectors on the entire screen, a distribution as shown in FIG. 7G is obtained. In this distribution, a value of Vdy with the highest frequency is determined as an estimated value of the offset derived from the vibration.

The vanishing point calculating means 108 of FIG. 1 cancels the estimated offset and then obtains an actual vanishing point again. At this point, in the case where, for example, a moving body occupies a large area in the screen or the vehicle is jolted in a direction other than the vertical direction or in the case where the vehicle is not running straight but making a turn or the like, the calculated vanishing point is largely different from the virtual vanishing point. In such cases, the subsequent moving body/approaching object detecting processing is suspended, and an image is synthesized by using a result obtained from a previous frame and the synthesized image is displayed.

Figure 8:
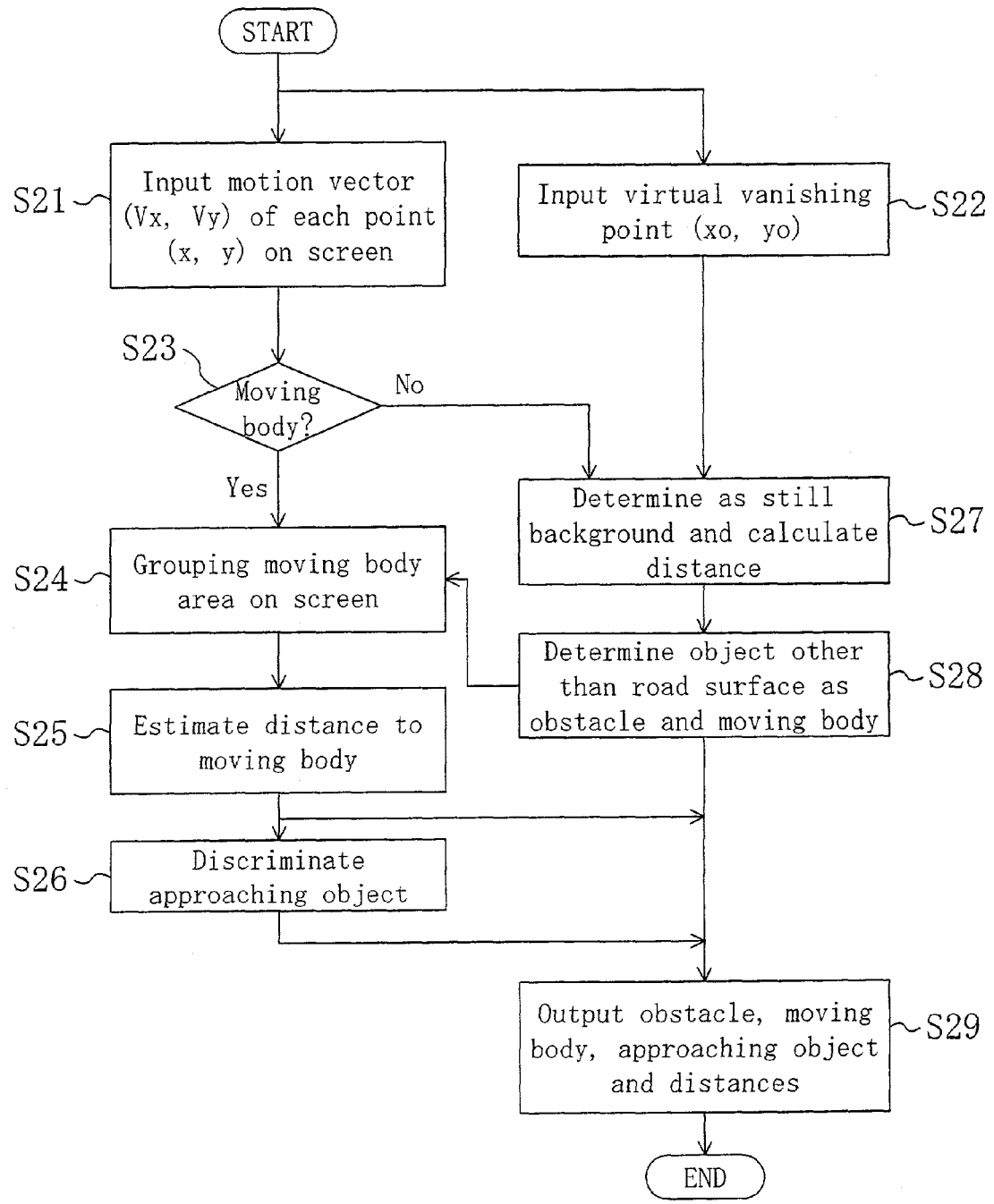
FIG. 8 is a flowchart for showing procedures in moving body/detected object detection.

On the other hand, in the case where the calculated vanishing point falls within a predetermined range in the vicinity of the virtual vanishing point, the processing is determined to be normal, and the moving body/approaching object detecting means 109 conducts the following operation:

FIG. 8 is a flowchart for showing the specific operation of the moving body/approaching object detecting means 109. First, in the same manner as in the vibration component extraction, a motion vector (Vx, Vy) with respect to each point (x, y) on the screen and the virtual vanishing point (x0, y0) are input (S21 and S22).

Figure 9A:
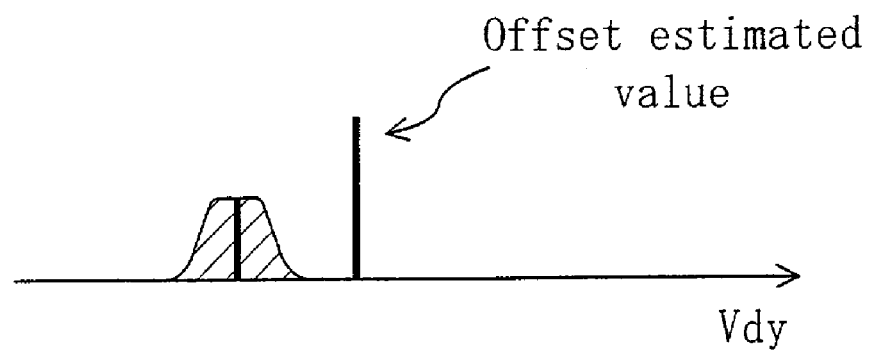
FIGS. 9A and 9B are diagrams for explaining a method for discriminating a moving body.
Figure 9B:
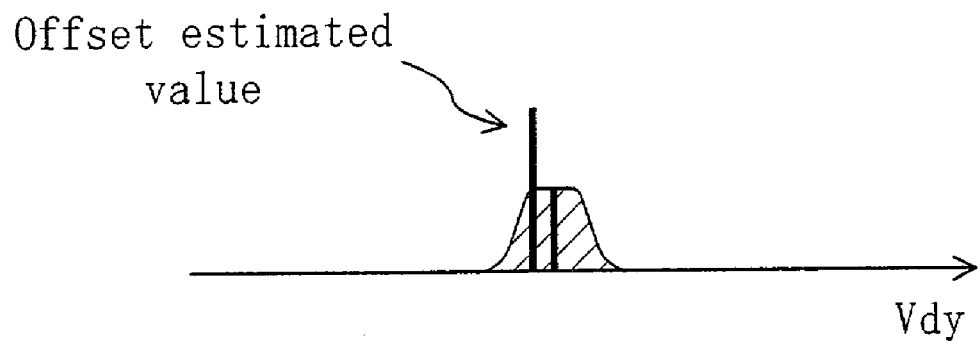

It is determined whether or not the point is a moving body depending upon whether or not the input vector represents movement toward the vanishing point after canceling the offset (S23). Specifically, as shown in FIG. 9, this determination is made depending upon whether or not the distribution of Vdy (of FIG. 7F) obtained in the vibration component extraction in consideration of the error (±Vnx, ±Vny) of the motion vector and the small error (±nx, ±ny) of the position on the screen accords with the offset estimated value. In other words, in FIG. 9A, since the distribution of Vdy and the offset estimated value do not accord with each other, the point of this motion vector is determined as a moving body. On the other hand, in FIG. 9B, since the distribution of Vdy and the offset estimated value accords with each other, the point of this motion vector is determined as the still background.

Figure 10A:
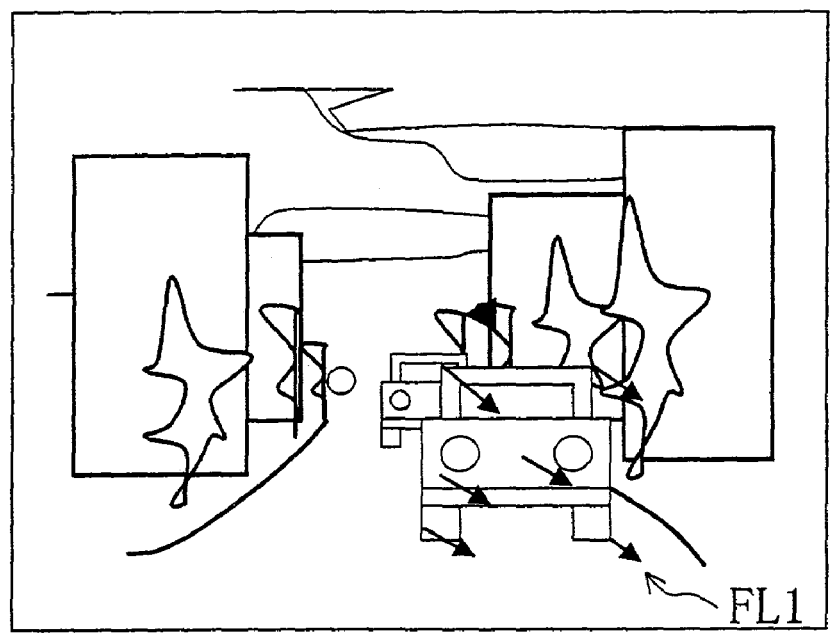
FIGS. 10A and 10B are diagrams for showing extraction of a moving body area by using a motion vector.
Figure 10B:
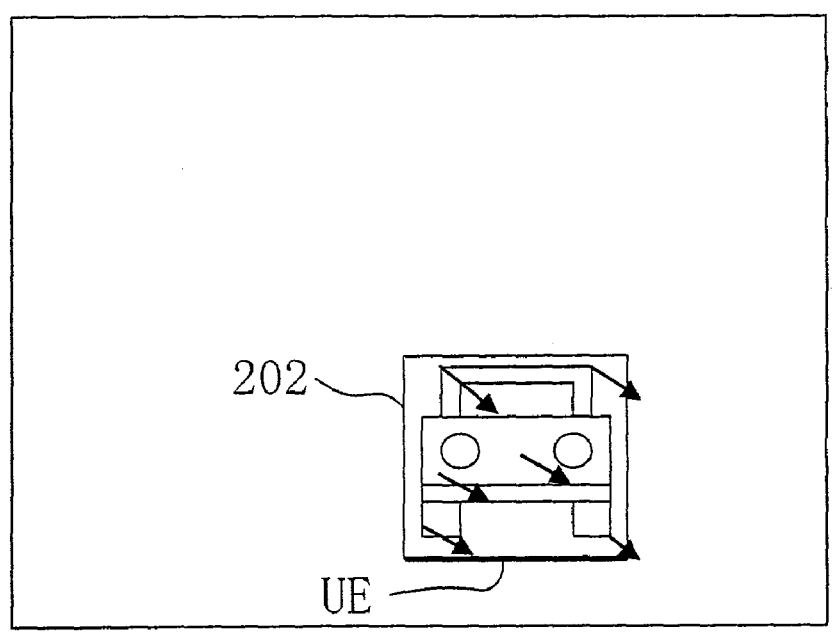

As shown in FIG. 10A, motion vectors FL1 each determined as a moving body are detected in respective portions of the moving body on the screen. Therefore, an area including these motion vectors FL1 is grouped as shown in FIG. 10B, so as to generate a rectangular moving body area 202 (S24). A distance from the vehicle to this moving body is then estimated on the position of the lower end UE of the moving body area 202.

Figure 11A:
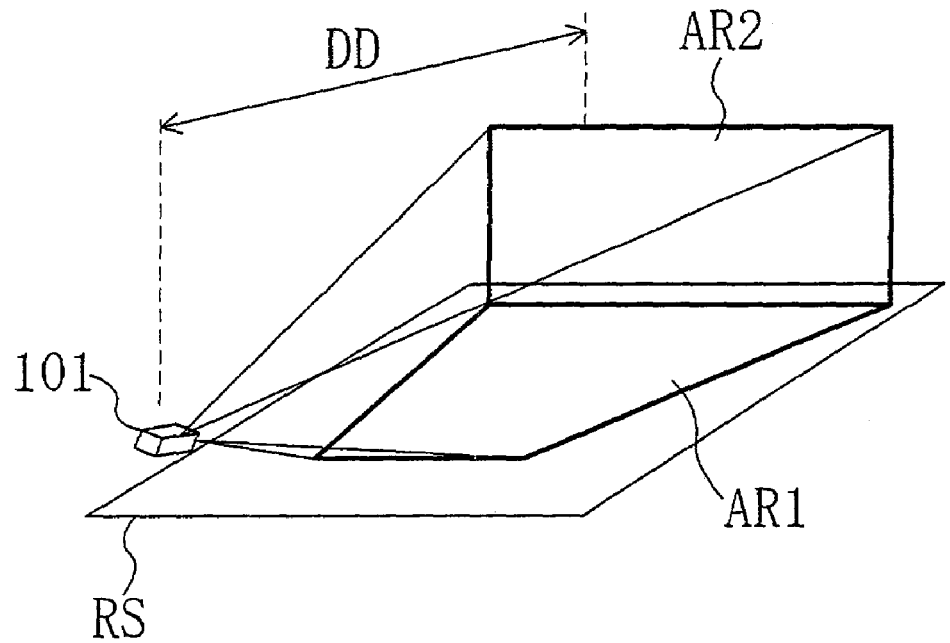
FIG. 11A is a diagram of a default distance value of an imaging range and FIG. 11B is a diagram for showing distance estimation employed when a moving body area extends over areas AR1 and AR2.

FIG. 11A is a diagram for showing a default distance value in an imaging range of the imaging means 101. Herein, as shown in FIG. 11A, a first area AR1 below a predetermined position in the camera image is assumed to be present on a road surface RS, and a second area AR2 above the predetermined position is assumed to be away from the imaging means 101 by a predetermined distance DD (of, for example, 50 m). Specifically, with respect to the first area AR1, an estimated distance to the road surface RS is stored as the default distance value, and with respect to the second area AR2, the predetermined distance DD is stored as the default distance value.

Figure 11B:
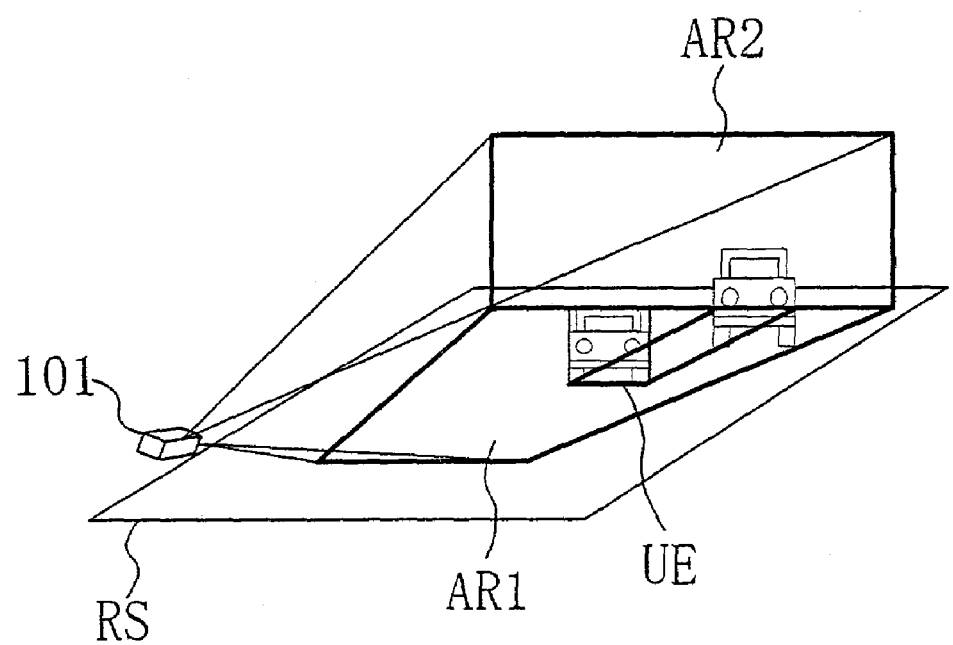

Furthermore, as shown in FIG. 11B, in the case where, for example, the moving body area 202 extends over the areas AR1 and AR2 on the screen, the distance is estimated on the basis of the lower end UE of the moving body area 202 included in the first area AR1 by assuming that the object is in contact with the road surface RS at the lower end UE.

The distance to the moving body area estimated at this point is stored in a memory. When a moving body area is detected in the same position through processing of a subsequent frame image and the estimated distance to the moving body area is shorter than the estimated distance obtained in the previous frame and stored in the memory, the object included in the moving body area is determined as an approaching object (S26).

Figure 12A:
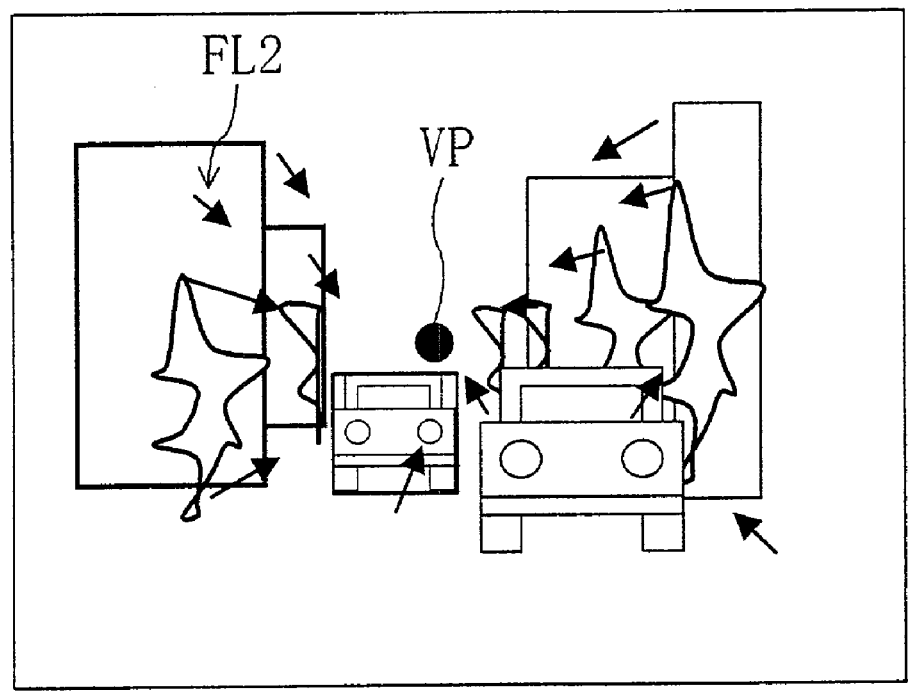
FIG. 12A is a diagram of an image where motion vectors of still background are shown and FIG. 12B is a diagram for explaining judgment of an obstacle.

On the other hand, with respect to motion vectors FL2 determined as the still background as shown in FIG. 12A, a distance Z is calculated on the basis of the size of the vector (with the offset canceled) by the following formula (S27):

$$Z=dZ*r/dr$$

wherein dZ is a travel length of the vehicle between the frames, r is a distance from the vanishing point VP on the screen and dr is the size of the motion vector, which are represented as follows:

$$r = sqrt((x-x0)^2 + (y-y0)^2))$$

$$dr = sqrt(Vx^2 + (Vy-Vdy)^2)$$

Figure 12B:
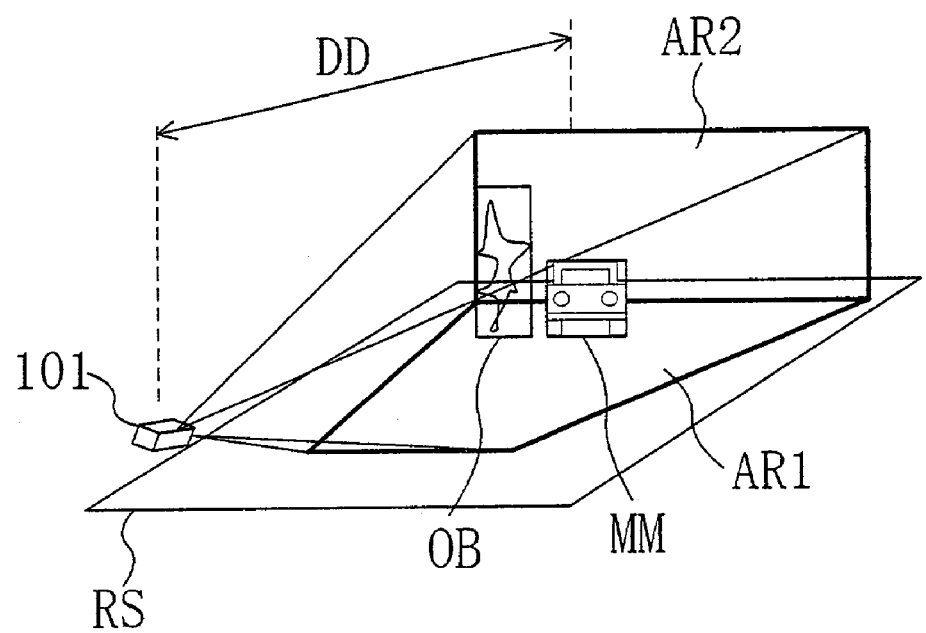

The distance Z obtained at this point is compared with the distance to the road surface stored as the default distance value (S28). Thus, an object positioned higher than the road surface, such as a roadside tree OB of FIG. 12B, is determined as an obstacle. Also, when an object is approaching from substantially right behind like a vehicle MM, a motion vector is obtained in the vicinity of the vanishing point, but its size is very small. Therefore, when the distance Z is obtained in the aforementioned manner, a value representing that the object is positioned below the road surface may be obtained. Since no object is generally present below the road surface, such a motion vector is determined as a moving body, so as to be processed through the moving body area extracting processing S24.

Through the aforementioned processing, an obstacle, a moving body, an approaching object and their distances in the image are obtained on the basis of the respective motion vectors of the points on the screen (S29), and the resultant information is output to the image synthesizing means 110.

Figure 13:
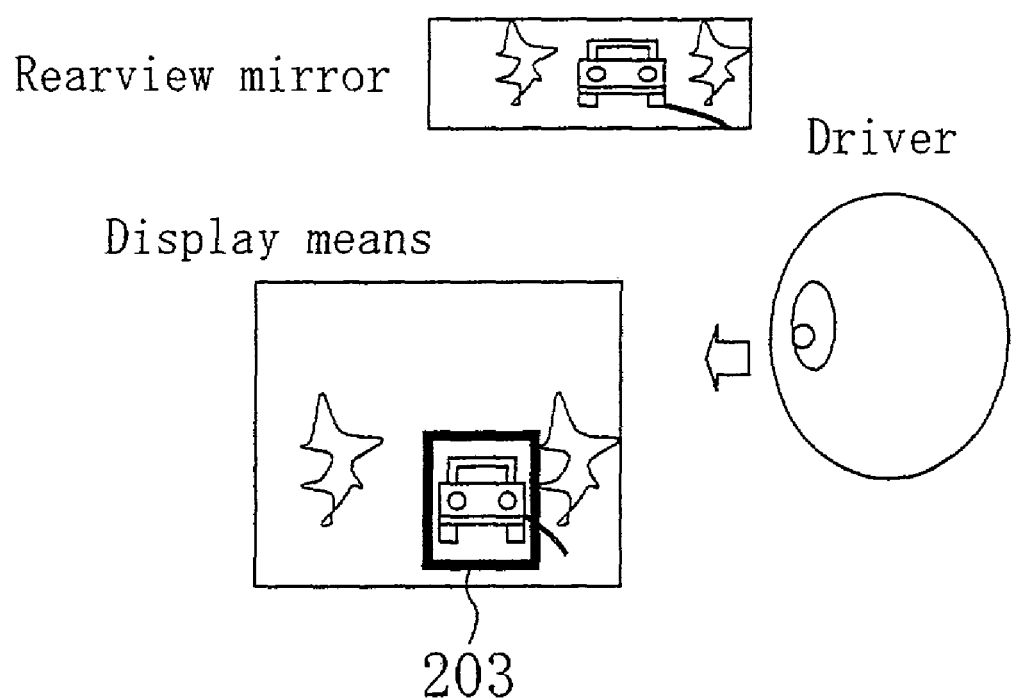
FIG. 13 is a diagram of an example of a display image.

The image synthesizing means 110 synthesizes a frame 203 of the rectangular area 202 to be lighted in red on the camera image input from the imaging means 101 as shown in FIG. 13 and outputs the synthesized image to the display device 111. The display device 111 displays an image obtained by laterally inverting the synthesized image so as to be in the same phase as an image on a rearview mirror.

In this manner, the driver sees the display image as shown in FIG. 13 so as to recognize the approaching of the approaching object owing to the lighting of the red frame 203. Specifically, the driver sees the camera image so as to confirm the environmental conditions and can naturally pay attention to an approaching object that should be particularly careful about without being surprised by an alarm sound or the like.

Also, information regarding from which direction and to what extent an approaching object is approaching to the self-vehicle, which is difficult to inform by using an alarm sound, can be directly and easily grasped.

Although an approaching moving body alone is displayed with a flashing red frame in this embodiment, a method for drawing attention of the driver is not limited to this but another color may be used or the red frame may be displayed without flashing. Furthermore, when the image of an approaching object displayed on the display device 111 is moving downward, it can be understood that the object is approaching the moving body, and when the image is moving upward, it can be understood that the object is moving away from the moving body.

Moreover, since the distance to the approaching object is obtained, the grasp of the environmental conditions by the driver can be further supported by displaying the distance itself or changing the display in accordance with the distance. The color of the frame may be changed in accordance with the distance, for example, the frame is displayed in green when the distance is 50 m or more, in yellow when the distance is less than 50 m and 20 m or more and in red when the distance is less than 20 m, or the distance value itself may be displayed in the upper right portion of the moving body area.

Embodiment 2

Figure 14:
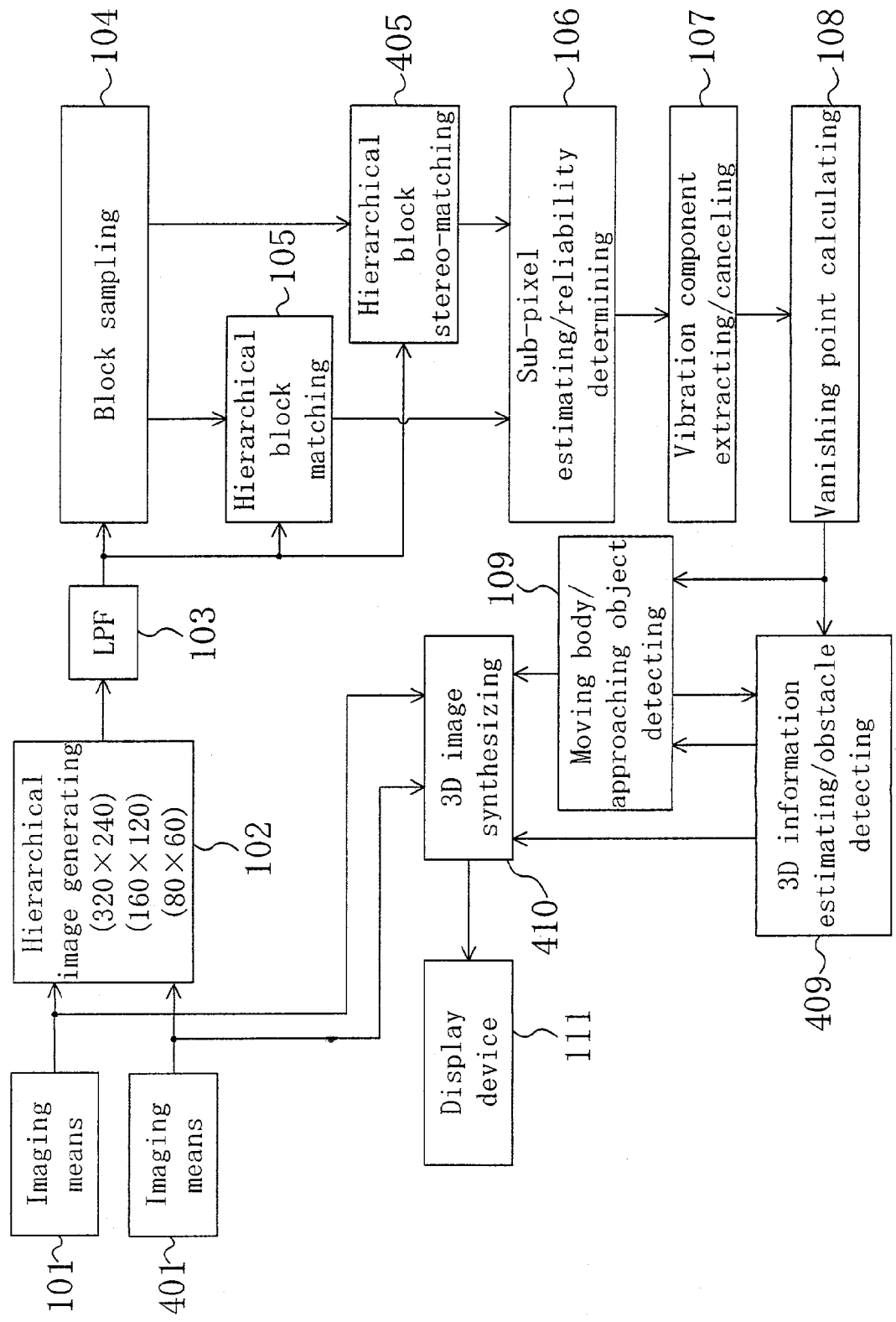
FIG. 14 is a block diagram for showing the structure of a driving support system according to Embodiment 2 of the invention.

FIG. 14 is a block diagram for showing the structure of a moving body image display system serving as a driving support system according to Embodiment 2 of the invention. In FIG. 14, like reference numerals are used to refer to like elements shown in FIG. 1 so as to omit the detailed description. Composing elements different from those shown in FIG. 1 are second imaging means 401 provided separately from first imaging means 101, hierarchical block stereo-matching means 405, 3D information estimating/ obstacle detecting means 409 and 3D image synthesizing means 410 serving as image synthesizing means or image generating means. The composing elements 102 through 109, 405 and 409 together form detection means.

An object of the moving body image display system of this embodiment is accurately detecting an approaching object or an obstacle close to a vanishing point having motion vectors (flows) difficult to accurately obtain. The operation of the moving body image display system of this embodiment will now be described with reference to FIGS. 15 through 21.

Figure 15:
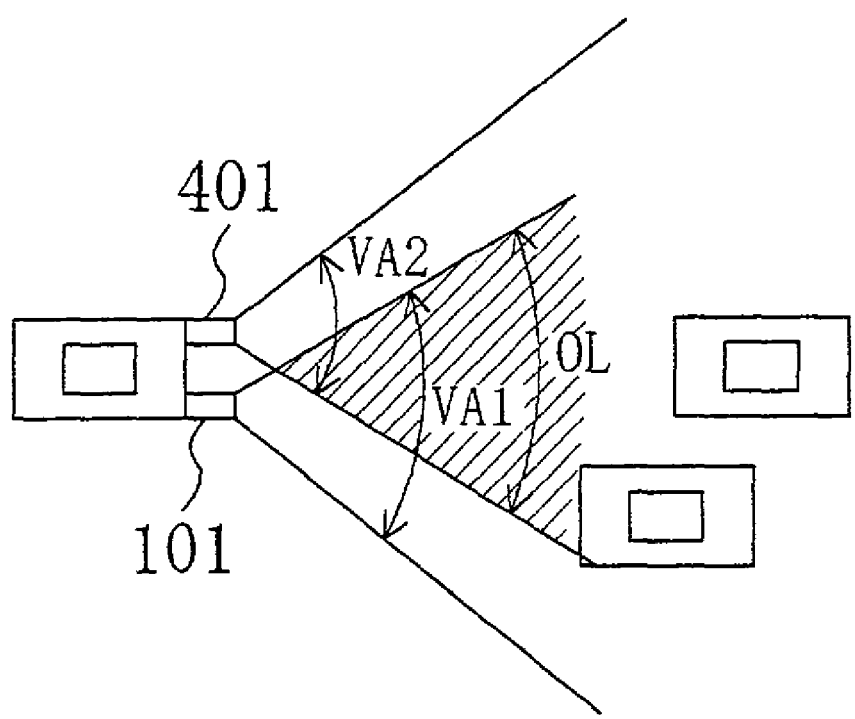
FIG. 15 is a schematic diagram for showing an example of arrangement of imaging means in Embodiment 2 of the invention.

FIG. 15 is a schematic diagram of a self-vehicle and the surrounding area seen from above. As shown in FIG. 15, in the driving support system of this embodiment, two imaging means 101 and 401 are installed on a rear portion of the vehicle apart from each other in the horizontal direction. The imaging means are disposed so as to have an overlap area OL where a first imaging range VA1 of the first imaging means 101 serving as one imaging means and a second imaging range VA2 of the second imaging means 401 serving as another imaging means overlap with each other.

The imaging means are disposed as shown in FIG. 15 in order to take an image of and monitor the rear of the vehicle with a wide visual field by using a camera having a general lens with a limited visual angle. When the plural imaging means are thus disposed, an image with a large visual field can be taken without using a special lens such as a fisheye lens. Also, by using the plural imaging means, the resolution of the obtained image can be kept high.

Moreover, it is necessary to combine obtained plural images together for display in the case where the system is used for monitoring. In the case where images taken from different positions as shown in FIG. 15 are combined, the two imaging ranges are preferably overlapped in consideration of occlusion accompanying the positions.

The processing will now be described in detail. The hierarchical image generating means 102, the LPF 103, the block sampling means 104 and the hierarchical block matching means 105 carry out the same processing as that of Embodiment 1 on each camera image input from the imaging means 101 and 401, so as to obtain flows (motion vectors).

Figure 16A:
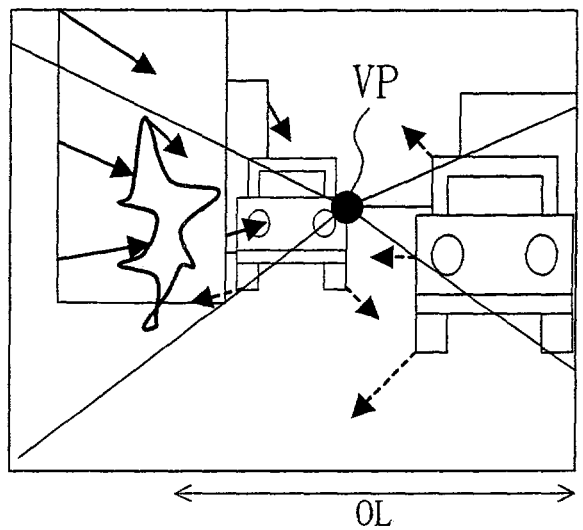
FIGS. 16A and 16B are diagrams of camera images in which flows are shown and FIG. 16C is a diagram in which a stereo parallax is obtained by overlapping the two images of FIGS. 16A and 16B.
Figure 16B:
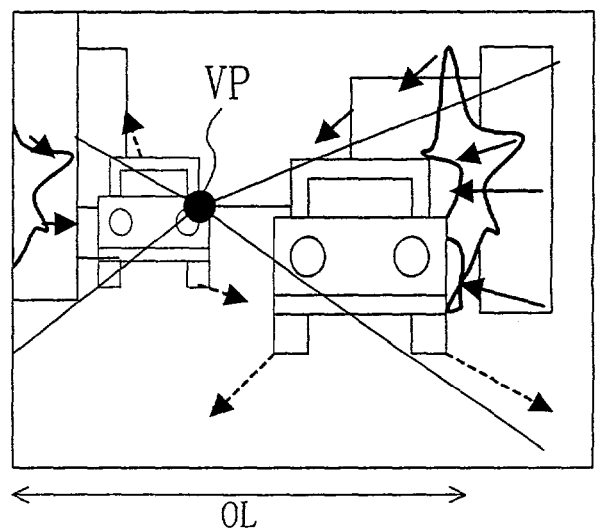

FIGS. 16A and 16B are diagrams in which the flows obtained in the aforementioned manner are overlapped on the camera images obtained by the imaging means 101 and 401, respectively. OL denotes an overlap area between the camera images. In FIGS. 16A and 16B, flows with respect to still objects such as a building and a tree are indicated by solid arrows, and flows with respect to moving bodies such as a car are indicated by broken arrows.

The flows with respect to the still objects are flows directing toward the vanishing point VP owing to the movement of the self-vehicle. The size of each of these flows is in proportion to the speed of the self-vehicle and the distance to the vanishing point VP on the screen. Therefore, a flow in the vicinity of the vanishing point VP has a small size, and hence is difficult to detect.

Therefore, the hierarchical block stereo-matching means 405 carries out stereo-analysis of the overlap area OL of the two images of FIGS. 16A and 16B so as to obtain a stereo parallax. Since the vanishing point VP is formed right behind in the running direction of the vehicle, the imaging means 101 and 401 can be easily installed so that the overlap area OL includes the vanishing point VP in the camera image.

Figure 16C:
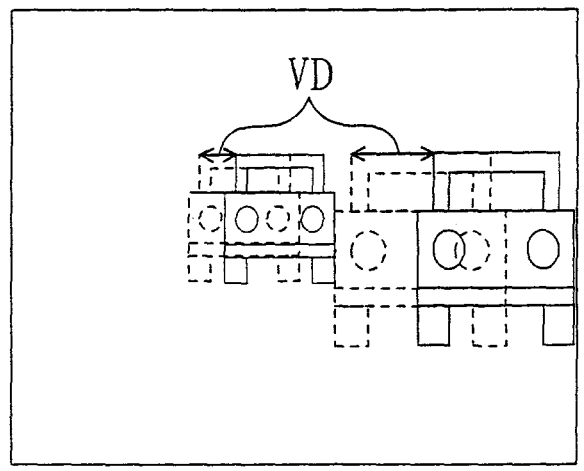

FIG. 16C is a diagram obtained by overlapping the two images of FIGS. 16A and 16B. In this drawing, dislocation VD in the image of the vehicle corresponds to the obtained stereo parallax.

When the imaging means are installed to be arranged in the horizontal direction, the stereo parallax VD is caused in substantially the horizontal direction. Therefore, an SAD (a sum of absolute differences) is obtained through block matching in a range of horizontal 5 pixels×vertical 3 pixels from the image of the higher hierarchy, and a stereo parallax is obtained from a point where the SAD is minimum. With respect to the image of the lower hierarchy, a stereo parallax is further obtained in a range of horizontal 5 pixels×vertical 3 pixels with a stereo parallax obtained in a block in the same position in the image of the higher hierarchy as the center.

The sub-pixel estimating/reliability determining means 106 estimates, by using the motion vector obtained in the image of the lowest hierarchy (camera image) and the SAD, a motion vector at accuracy of one or less sub-pixel based on the SAD minimum point and SAD values at eight points around the SAD minimum point. Also, it determines the reliability of the motion vector in the block.

Furthermore, the processing for the motion vectors is applied to the stereo parallax VD obtained by the hierarchical block stereo-matching means 405 in the completely same manner, so as to estimate a stereo parallax at accuracy of a sub-pixel and determine the reliability of the stereo parallax.

Through the aforementioned processing, a flow corresponding to movement with time from a previous frame is obtained with respect to each point on the camera image, and the stereo parallax is obtained in the overlap area OL.

In general, when the stereo parallax and the relative positional relationship between the imaging means are found, a distance from the imaging means to the object can be obtained through the principle of the trigonometrical survey. Also, on the basis of a flow corresponding to the movement with time of an image, by assuming that, for example, the object is still on the ground, the distance from the imaging means to the object can be obtained in relation to the running speed.

Figure 17:
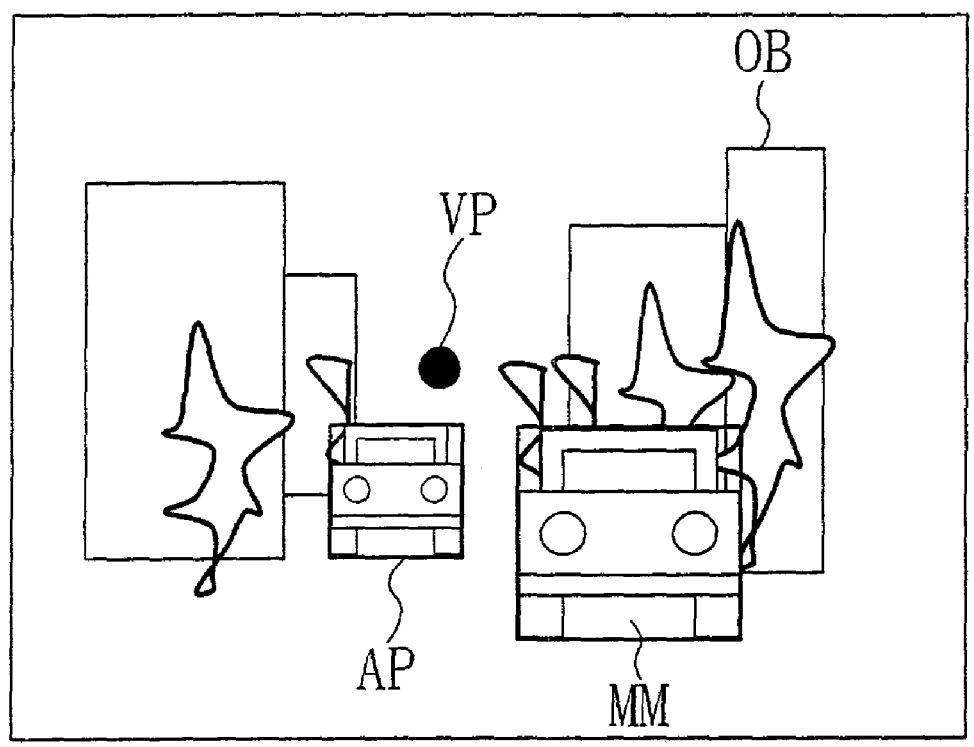
FIG. 17 is a diagram of an example of an image in which an obstacle, a moving body and an approaching object are extracted.

By using this, the 3D information estimating/obstacle detecting means 409 estimates three-dimensional information with respect to the two camera images as shown in FIG. 17, and detects, as an obstacle OB, an area on the screen estimated to be at a predetermined height or more above the ground.

Also, the moving body/approaching object detecting means 109 extracts, as a moving body/approaching object candidate block, a block having a motion vector different from a flow directing toward the vanishing point VP, and extracts a moving body MM as shown in FIG. 17 by linking moving body/approaching object candidate blocks close to one another. Furthermore, when it is determined that the distance to an obstacle present in an area in the vicinity of the vanishing point VP is approaching on the basis of the three-dimensional information obtained from the 3D information estimating/obstacle detecting means 409, this object is extracted as an approaching object AP as shown in FIG. 17.

As shown in FIG. 17, the 3D image synthesizing means 410 utilizes the three-dimensional information obtained from the 3D information estimating/obstacle detecting means 409 so as to synthesize the two camera images input from the imaging means 101 and 401. Furthermore, it displays, on the synthesized image, areas of the moving body MM and the approaching object AP surrounded with, for example, lighting red frames, and displays the obstacle OB surrounded with, for example, a green frame, and they are output to the display device 111. At this point, the display device 111 displays an image obtained by laterally inverting the synthesized image to be in the same phase as an image on a rearview mirror.

The driver sees the display image as shown in FIG. 17, so as to be informed of approaching of the moving body MM and the approaching object AP owing to the lighting of the red frames, and can directly and easily grasp from which direction and to what extent the approaching object AP is approaching the self-vehicle. Furthermore, the driver can directly and easily grasp the presence and the position of the obstacle owing to the display of the green frame.

Furthermore, as in the second conventional example and in Embodiment 1 of the invention, in the method so-called "motion stereo" for detecting an obstacle and an approaching object through movement analysis of a camera image, three-dimensional information of the camera image is obtained by analyzing change of an image in accordance with change of a visual point through movement. In this case, there is a problem that the change of an image taken in a moving direction or a reverse direction in accordance with the change of the visual point is small in an area in the vicinity of the vanishing point of flows (motion vectors) derived from the movement. When this method is applied to, for example, a vehicle, there arises a problem that the sensitivity of the detection is lowered in a region closer to the forward or backward region along the running direction.

However, according to Embodiment 2, detection in an area in the vicinity of the vanishing point on the screen is compensated by the stereo analysis of the overlap area OL obtained by the two cameras, and hence, detection can be carried out at high sensitivity.

The 3D image synthesizing means 410 utilizes the three-dimensional information obtained from the 3D information estimating/obstacle detecting means 409 so as to appropriately inform the driver of the information of the approaching object and the obstacle. The method will now be described.

In Embodiment 1, when a camera image synthesized with the information of an approaching object is seen, a distance in a depth direction in the screen should be determined based on the apparent size of the object on the synthesized image. In particular, when the imaging means is installed on a vehicle, it cannot be provided in a position higher than the height of the vehicle and should be directed substantially horizontal direction for allowing a rather far place to come in sight. As a result, the distance to an approaching object is unavoidably in the depth direction in the screen.

As a method for easily grasping the distance to an approaching object on a screen, a technique to change the visual point of a synthesized image as disclosed in Japanese Patent Application No. 10-217261 devised by the present inventors can be employed. In a system disclosed in this application, plural camera images around a vehicle are assumed to be obtained by three-dimensionally taking images of the ground, so as to generate a synthesized image from a new visual point, for example, as if it were looked down from the sky. In this case, a distance between the vehicle and another object is in proportion to the distance on the screen, and hence, it can be intuitively grasped.

The 3D image synthesizing means 410 of this embodiment utilizes the aforementioned technique to convert the camera images obtained by the imaging means 101 and 401 into a synthesized image seen from a visual point higher than the actual installation positions of the imaging means. In order to attain a large visual field up to a far place, a visual point looking obliquely downward is preferred to a visual point looking right below.

Figure 18A:
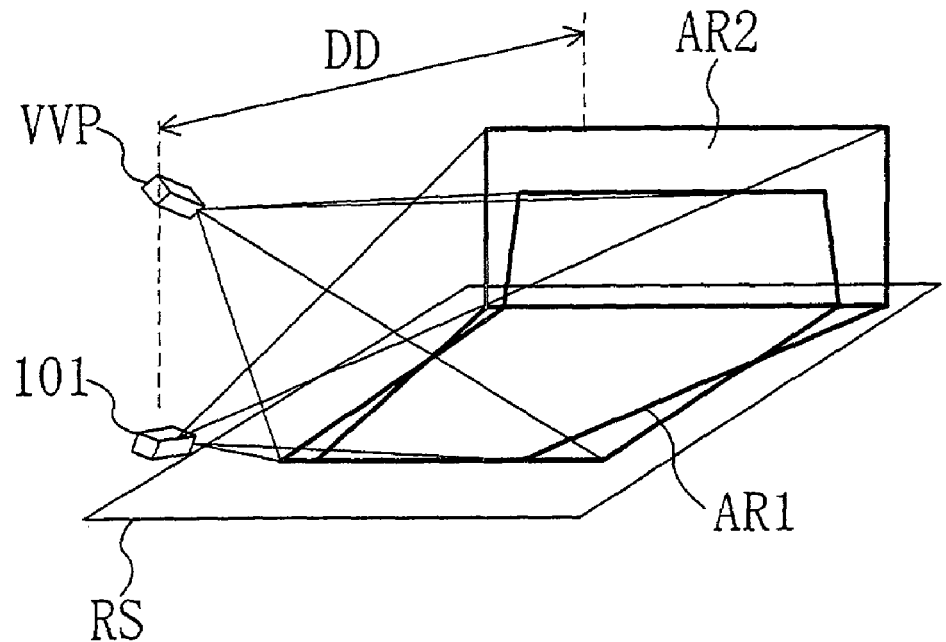
FIGS. 18A and 18B are diagrams for showing a virtual visual point used for obtaining a synthesized image where a moving body is three-dimensionally displayed.
Figure 18B:
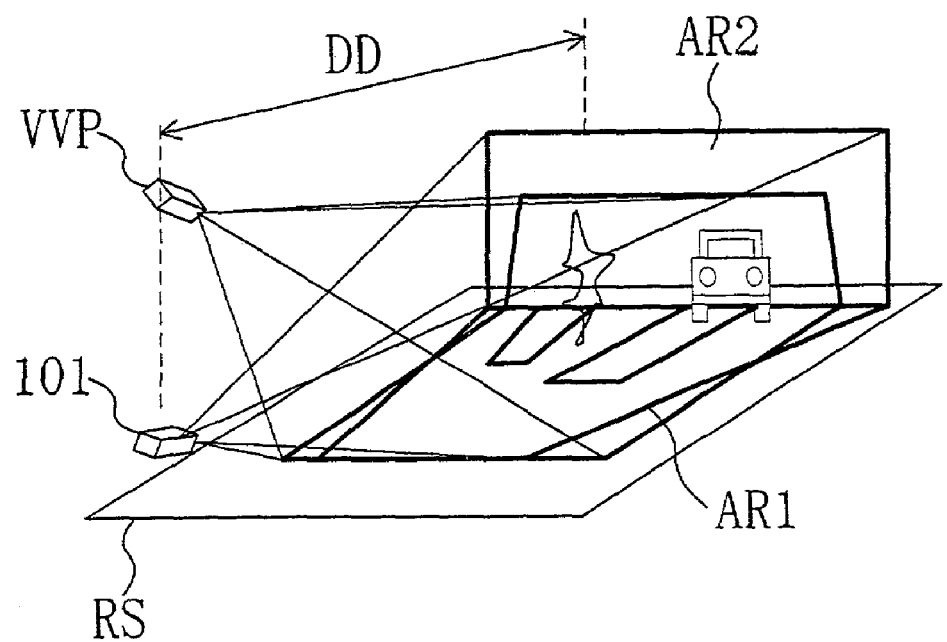

FIG. 18A shows the position of a virtual visual point VVP for obtaining such a synthesized image. The virtual visual point VVP is positioned above the imaging means 101 and directed to an obliquely downward direction behind the vehicle. When the actual camera image obtained by the imaging means 101 is assumed to be at the default distance described with reference to FIG. 11A, the synthesized image seen from the virtual visual point VVP can be generated from the actual camera image as shown in FIG. 18B.

Figure 19A:
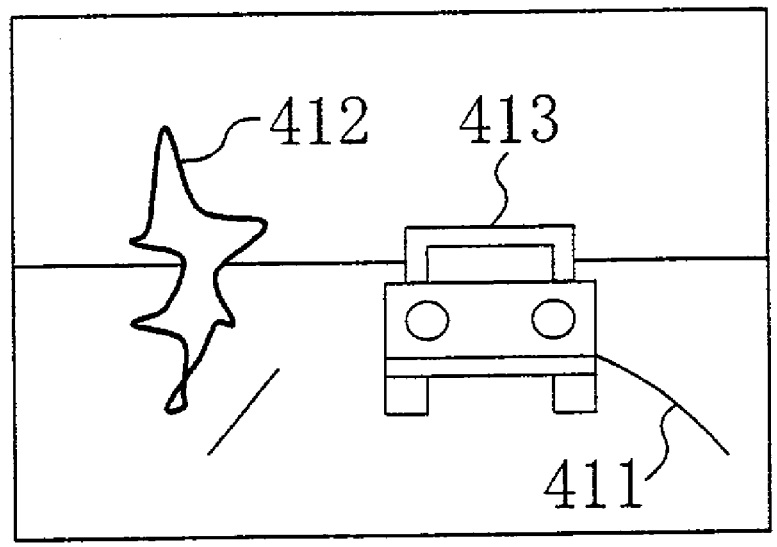
FIG. 19A is a diagram of an example of an actually taken camera image and FIG. 19B is a synthesized image generated from FIG. 19A.
Figure 19B:
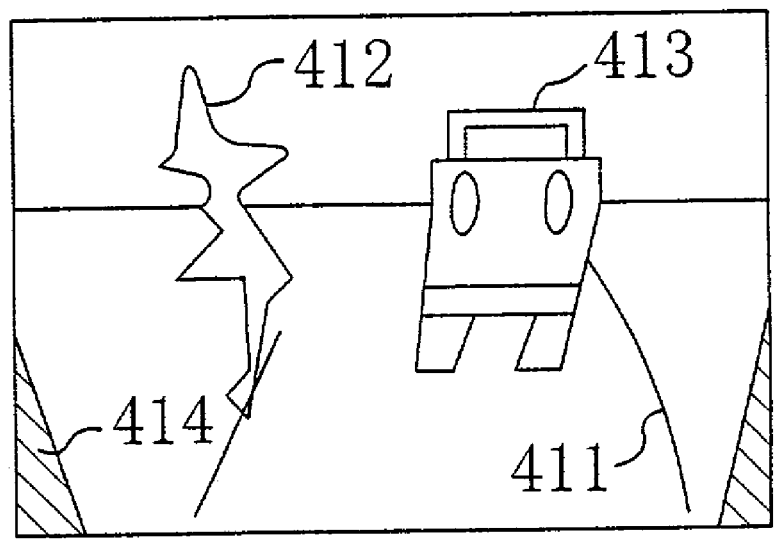

For example, when the actual camera image is as shown in FIG. 19A, the synthesized image seen from the virtual visual point VVP is as shown in FIG. 19B. As is understood from FIG. 19, a white line 411 and the like actually present on the road surface at the default distance are synthesized in accurate positions also on the synthesized image, and since it is an image seen from above, the distance is enhanced to be easily grasped. However, a tree 412 and a vehicle 413 that are not actually present on the road surface are elongated to be unnaturally distorted on the synthesized image. The synthesized image shown in FIG. 19B includes an area 414 outside the image actually taken.

Specifically, when the conventional image synthesizing technique is directly applied, since the position of the ground alone is assumed in the image conversion, objects not actually present on the ground, such as another vehicle and an obstacle, are disadvantageously distorted on the synthesized image.

Therefore, in this embodiment, the three-dimensional information obtained from the 3D information estimating/obstacle detecting means 409 is utilized, so that the distortion of a vehicle and the like caused on the synthesized image can be largely improved. This will be described with reference to FIGS. 20 and 21.

Figure 20A:
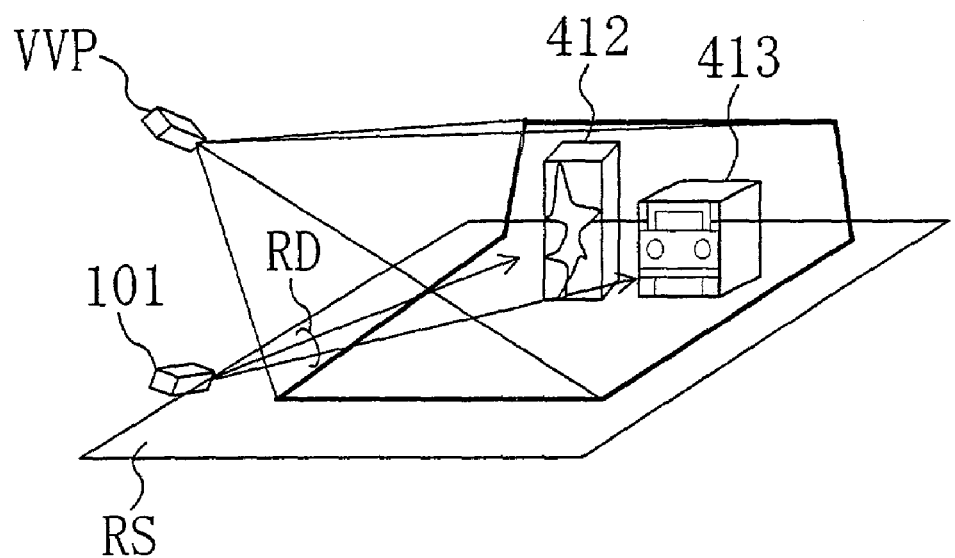
FIGS. 20A and 20B are diagrams for explaining image synthesis in consideration of a detected distance.

In this embodiment, the three-dimensional information obtained from the 3D information estimating/obstacle detecting means 409 is utilized for detecting an obstacle and an approaching object present above the ground. Therefore, an area of the obstacle or the approaching object is synthesized in accordance with the three-dimensional information as shown in FIG. 20A, and hence, even when an image seen from the virtual visual point VVP is synthesized, the synthesized image can be a natural image free from distortion.

Figure 20B:
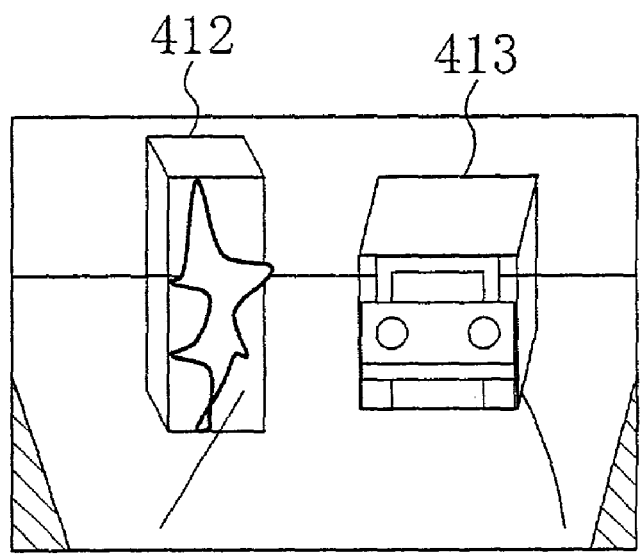

Specifically, with respect to the tree 412 and the vehicle 413 actually not present on the road surface, the actual distances RD from the imaging means 101 are detected, and therefore, the areas are synthesized in positions determined in consideration of the actual distances RD on the synthesized image. Accordingly, as shown in FIG. 20B, the tree 412 and the vehicle 413 not actually present on the road surface are synthesized not on the basis of the default distances but on the basis of the actual distances RD, and hence, they are not elongated but can be natural on the synthesized image.

In this manner, in the synthesized image, a white line and the like that are actually present on the road surface at the default distances are synthesized in accurate positions, and also with respect to a tree and a vehicle that are not actually present on the road surface, natural images can be obtained. Furthermore, since the synthesized image is an image seen from above, an image in which a distance can be easily grasped can be presented to the driver.

Figure 21A:
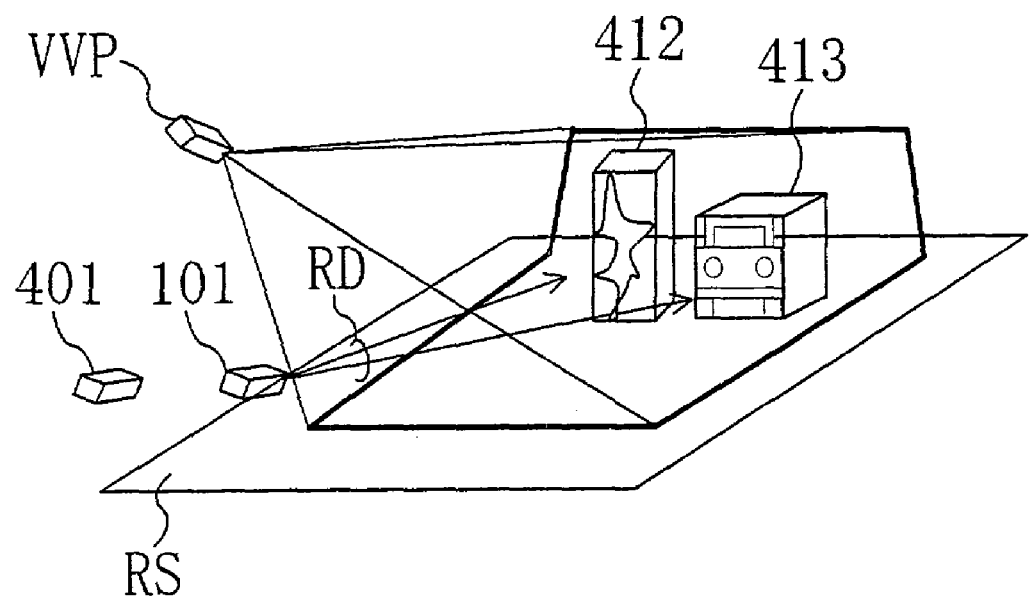
FIGS. 21A and 21B are diagrams for explaining image synthesis in consideration of a detected distance by using two imaging means.
Figure 21B:
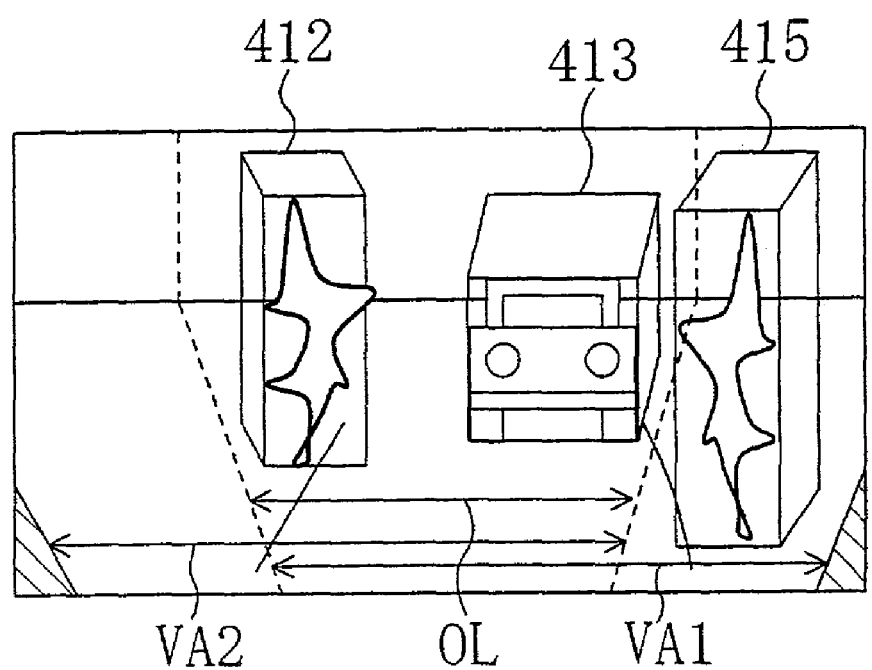

FIG. 21 is a diagram of generation of a synthesized image from the camera images of the two imaging means 101 and 401. As shown in FIG. 21A, also in this case, with respect to a tree 412 and a vehicle 413 that are not actually present on the road surface, the actual distances RD from the imaging means 101 and 401 are detected, and hence, the areas are synthesized in positions determined in consideration of the actual distances RD on the synthesized image. Thus, a synthesized image as shown in FIG. 21B is obtained. In the synthesized image of FIG. 21B, VA1 and VA2 respectively denote areas corresponding to the visual field ranges of the imaging means 101 and 401, and OL denotes an overlap area where the visual field ranges are overlapped. As compared with the image shown in FIG. 20B, an image with a wide visual angle is synthesized. Furthermore, in an area outside the overlap area OL, a distance can be also obtained based on a flow because it is away from the vanishing point, and therefore, for example, a tree 415 can be synthesized in a position in consideration of the distance.

Modification of Embodiment 2

A modification of Embodiment 2 will now be described with reference to FIGS. 22 and 23.

Figure 22A:
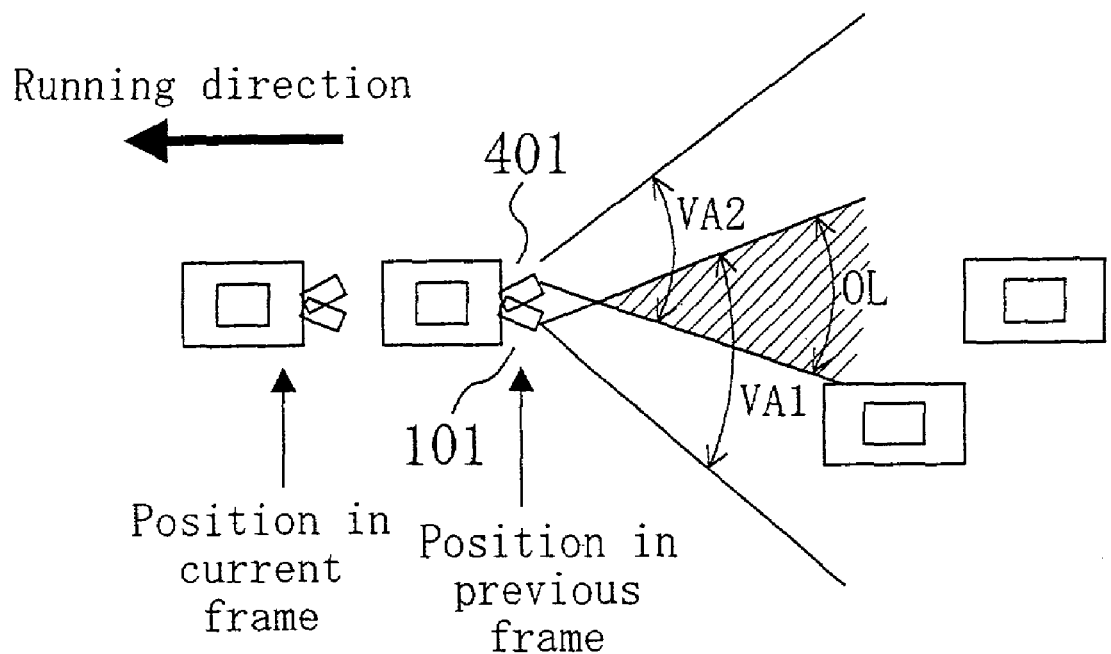
FIGS. 22A and 22B are diagrams for showing an example of arrangement of imaging means according to a modification of Embodiment 2 of the invention.
Figure 22B:
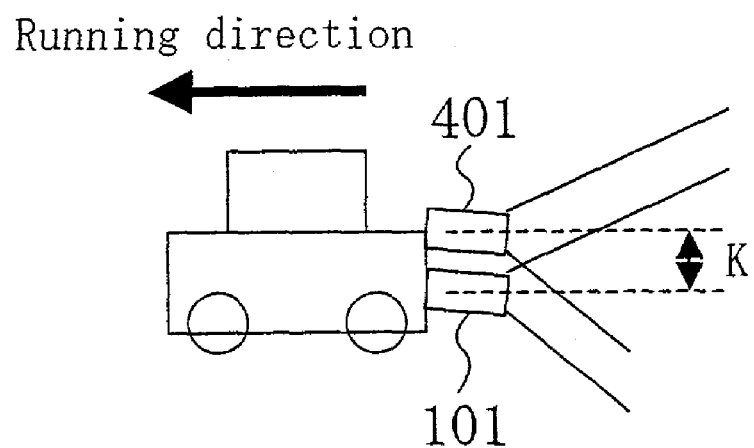
Figure 23A:
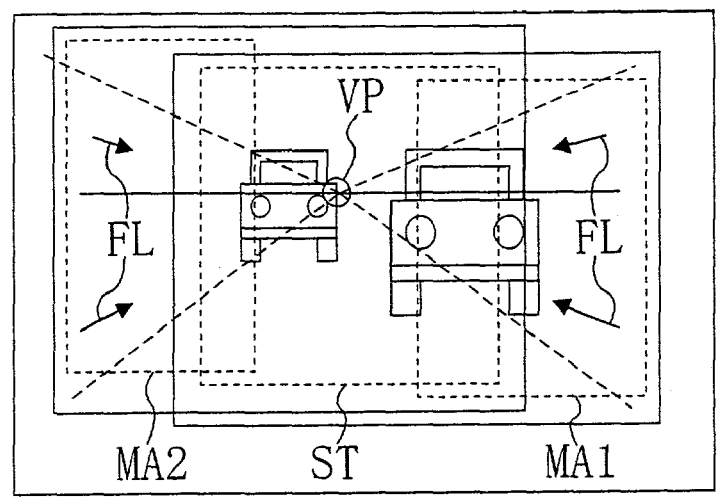
FIGS. 23A, 23B and 23C are diagrams for explaining a method for obtaining a stereo parallax according to the modification of Embodiment 2 of the invention.

FIG. 22 is a diagram for showing an example of the arrangement of the imaging means according to this modification. Differently from the aforementioned embodiment, the two imaging means 101 and 401 are installed to be apart from each other at a distance k not in the horizontal direction but in the vertical direction. Also, with respect to the visual field ranges of the imaging means, similarly to Embodiment 2, the first imaging area VA1 of the imaging means 101 and the second imaging area VA2 of the imaging means 401 are overlapped with each other so as to have the overlap area OL.

Similarly to Embodiment 2, a stereo-analysis area ST is provided in the overlap area between the two imaging areas, and movement analysis areas MA1 and MA2 are provided in other portions.

The processing in the stereo-analysis area ST of this modification will now be described.

Figure 23B:
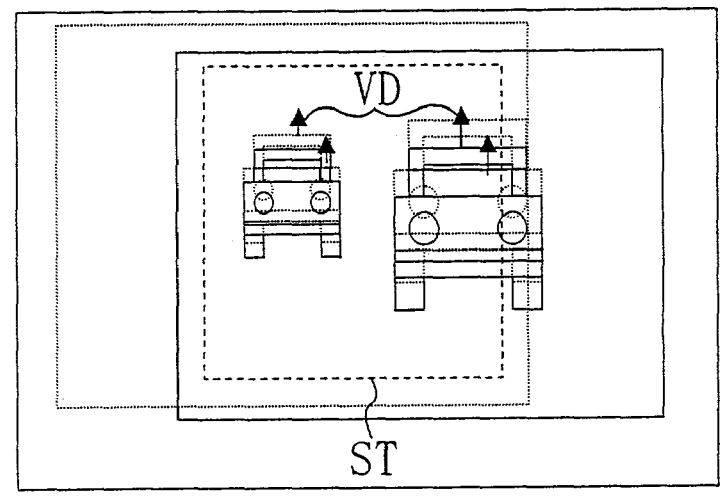
Figure 23C:
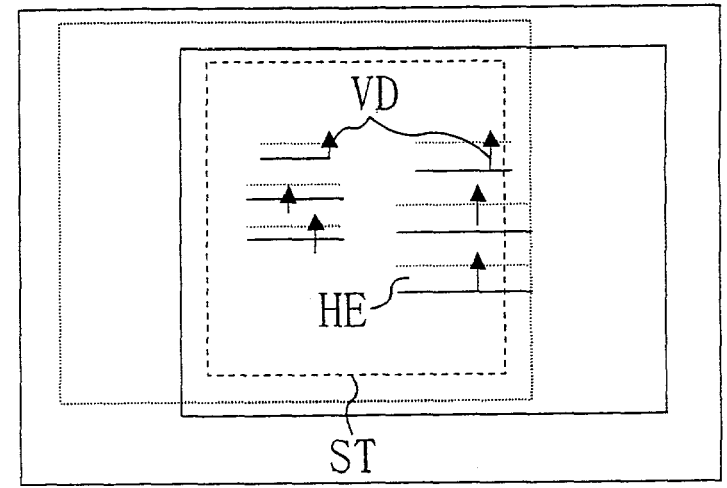

As shown in FIG. 23B, a stereo parallax VD is caused in the vertical direction in these two images. At this point, horizontal edges HE are previously extracted from the two images as shown in FIG. 23C, and the two images are compared with each other with respect to the horizontal edges HE, so as to easily obtain the stereo parallax VD. Furthermore, an image of a vehicle running on the road, which is the principal object of this invention, includes a larger number of horizontal edges, such as the bumper and a line of the bonnet, as compared with other edges, and hence can be easily detected. Since a distance from the imaging means is obtained from the stereo parallax VD, an approaching object and an obstacle can be detected in the same manner as in the aforementioned embodiment, and an image of an approaching object or an obstacle can be three-dimensionally synthesized to be displayed.

In this modification, the two imaging means and the virtual visual point are arranged in the vertical direction, and hence, a vertical parallax is enhanced in the synthesized image. Furthermore, in an area where the number of horizontal edges is so small that the stereo parallax VD cannot be accurately obtained, the accuracy of the synthesized image is also lowered, but since the number of horizontal edges is small, unnaturalness caused by positional dislocation is minimally recognized. Accordingly, the synthesized image is very natural as a whole, and in an area where there are horizontal edges (such as an area where another vehicle is imaged), a synthesized image in which information on a position in the depth direction is enhanced can be generated.

Now, the relationship between the distance k between the imaging means and a detectable distance will be complementarily described. For simplifying the description, it is assumed that the imaging means is directed toward right behind. Assuming that an angle of the imaging means in the horizontal direction is approximately 90 degrees, when a distance D is 10 m, the field angle range in the horizontal direction corresponds to approximately 20 m. Furthermore, when the aspect ratio of pixels of the imaging means is 3:4, the field angle range Vh in the vertical direction corresponds to approximately 15 m. Specifically, Vh/D=1.5. Also, when the number of pixels in the vertical direction of the screen is Vp, a distance D required for a horizontal edge of a vehicle running behind and positioned at the same height as the imaging means to approach for causing a parallax corresponding to one pixel from parallax zero at infinite is obtained, on the basis of a formula, Vh/k=Vp, as follows:

$$D=k*Vp/1.5$$

When the number Vp of pixels in the vertical direction is 480 and the distance k between the imaging means is 10 cm (=0.1 m), the distance D is roughly estimated as follows:

$$D=0.1*480/1.5=32 \text{ (m)}$$

The actual accuracy for detecting a parallax is 0.3 through 1 pixel, and assuming that a desired distance for detecting an approaching object is 30 through 70 m and that the field angle of the imaging means is 60 through 120 degrees, the distance between the imaging means may be approximately 7 through 20 cm according to rough calculation.

In this manner, even when the imaging means are provided to be apart from each other at a comparatively small distance of approximately 7 through 20 cm, an approaching object can be detected, and hence, the system can be installed on a vehicle with more ease.

A region behind a vehicle is described as a principal monitoring region in Embodiments 1 and 2, which does not limit the invention. For example, a region in front or on a side of the vehicle may be the monitoring region so as to generate an image of the region in front or on the side of the vehicle.

Embodiment 3

Figure 24:
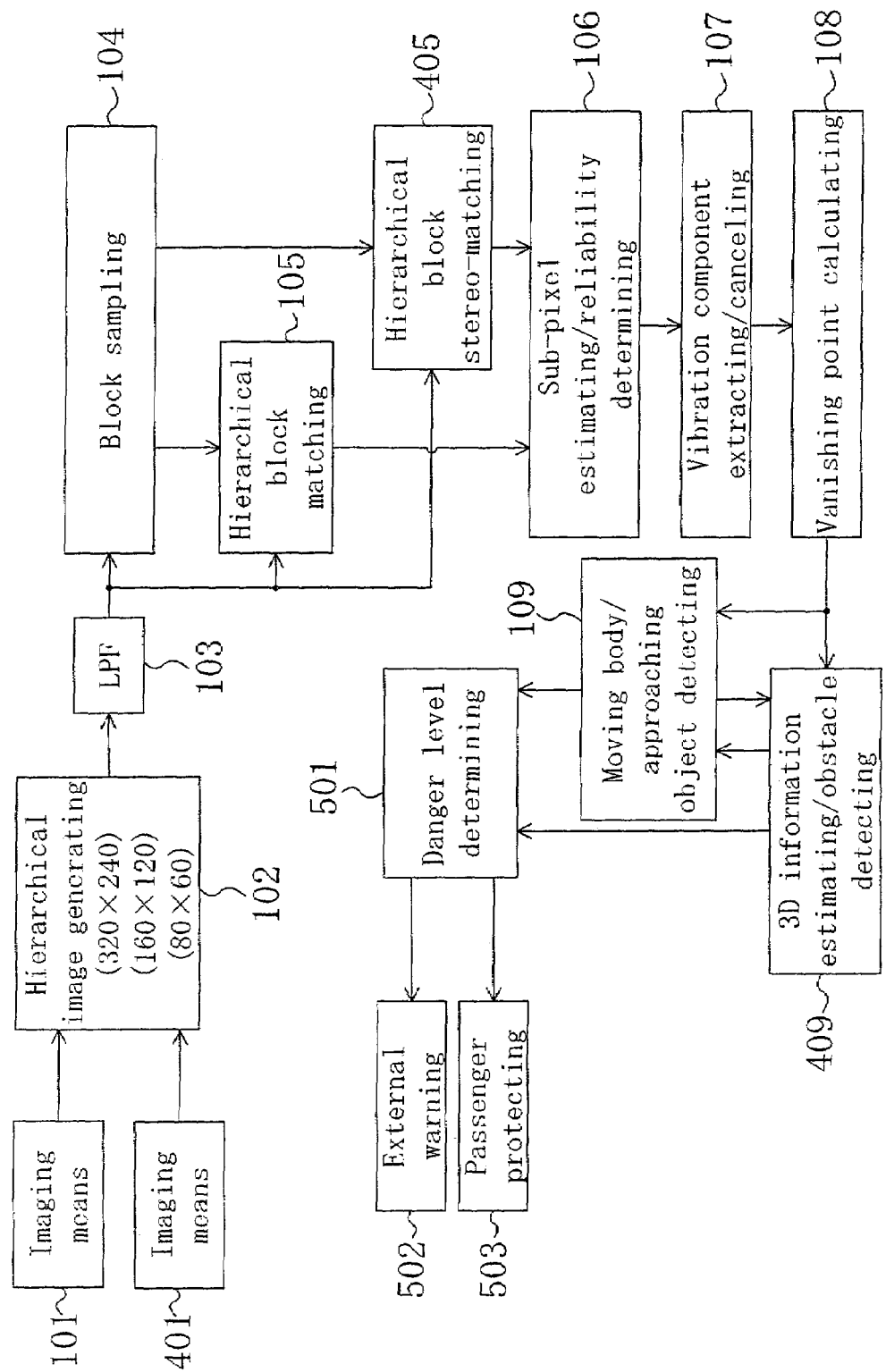
FIG. 24 is a block diagram for showing the structure of a driving support system according to Embodiment 3 of the invention.

FIG. 24 is a block diagram for showing the structure of a driving support system according to Embodiment 3 of the invention. In FIG. 24, composing elements different from those shown in FIG. 14 are danger level determining means 501, external warning means 502 and passenger protecting means 503.

Similarly to Embodiment 2, an overlap area between plural imaging means 101 and 401 is stereo-analyzed by the hierarchical stereo-matching means 405, so as to accurately detect an approaching object right behind the vehicle, which is conventionally difficult to detect.

A conventional system for detecting an approaching object does not cover an object approaching from right behind not only because such an approaching object is difficult to detect merely by movement detection but also because there are few methods for avoiding collision or the like after the detection of such an approaching object. For example, in the first conventional example, in the case where an object approaching from a lane adjacent to the lane where the self-vehicle is running is detected, collision can be easily avoided by warning not to change the course to the adjacent lane. On the other hand, with respect to a vehicle approaching in the same lane as the self-vehicle, it is necessary to make positive movement, such as to evade forward by increasing the speed or to change the course to another lane. In either case, there arises another risk such as collision with another vehicle or object other than the approaching object.

Therefore, in this embodiment, when the moving body/approaching object detecting means 109 detects an object approaching from right behind, the danger level determining means 501 determines a possibility of collision with this approaching object on the basis of time up to the collision, change of the speed of the approaching object and the like. When it determines that there is a strong possibility of collision, an indicator signal is output. The external warning means 502 receives the indicator signal and gives a warning behind by, for example, automatically lighting a brake light. This warning is not limited to the lighting of a brake light but may be radiation or flash of another light provided to face backward, an alarm sound, or a warning using electric waves such as a radio.

When the danger level determining means 501 outputs the indicator signal, the passenger protecting means 503 takes measure to protect passengers such as winding up a seat belt or preparation for the operation of an air bag system. With respect to the air bag system, if it is previously found that there is a strong possibility of collision, various preparation such as the preparation for the operation and detection of heads of passengers can be carried out, so as to definitely protect the passengers.

The detection means for an approaching object of this embodiment is not limited to the means utilizing the stereo-images and the movement analysis but may be another means using, for example, radar or laser.

It goes without saying that the invention can be easily applied to a moving body other than a vehicle, such as a ship, an airplane and a train.

Also, the installation positions and the number of plural imaging means are not limited to those described herein.

Furthermore, the functions of the detection means and the image generating means of the driving support system of this invention may be wholly or partially realized by dedicated hardware or software. Also, a recording medium or a transfer medium storing a program for making a computer execute the whole or a part of the functions of the detection means and the image generating means of the driving support system of this invention may be used.

As is obvious from the above description, according to the invention, an approaching object can be detected without being influenced by vibration derived from jolt of a vehicle. Also, when the stereo-analysis using a plurality of imaging means is utilized together, an approaching object right behind that causes a small movement change in an image can be detected.

Since the detection result of an approaching object and the like is informed on a display image, the driver can directly confirm the positional relationship and the environmental conditions. Furthermore, when an image is converted into an image seen from a higher visual point looking obliquely downward, the distance to an approaching object can be displayed more simply.

Moreover, not only the driver is informed but also a warning is given to an approaching vehicle, the possibility of collision can be lowered, and measure to protect passengers from the impact of the collision can be started earlier.

In this manner, the present invention provides a driving support system for reducing burdens of a driver.

The invention claimed is:

1. A system for supporting driving of a moving body comprising:
    a plurality of imaging means installed on said moving body for taking camera images of the rear of said moving body; and
    detection means for detecting movement of an object present in the rear of said moving body based on said camera images of said plurality of imaging means,
    wherein said plurality of imaging means have, in camera images thereof, an overlap area that includes an area in the vicinity of a vanishing point and in which imaging areas of first imaging means and second imaging means overlap with each other,
    said detection means obtains a stereo parallax between said first imaging means and said second imaging means in said overlap area, and obtains a distance to said object on the basis of said obtained stereo parallax, and
    wherein said detection means detects flows corresponding to movement with time of an image in the imaging area of said first imaging means excluding said overlap area, and detects movement of said object present in the rear of said moving body on the basis of said detected flows.

2. The driving supporting system of claim 1, further comprising image synthesizing means for generating an image representing the rear of said moving body through image synthesis using said camera images of said plurality of imaging means.

3. The driving supporting system of claim 1, further comprising:
    danger level determining means for determining a possibility of collision of said moving body with an approaching object from the rear of said moving body on the basis of information output from said detection means and for outputting an indicator signal when it is determined that there is a strong possibility of the collision; and
    external warning means for providing a warning to the rear of said moving body when said indicator signal is output form said danger level determining means.

4. The driving supporting system of claim 1, further comprising:
    danger level determining means for determining a possibility of collision of said moving body with an approaching object from the rear of said moving body on the basis of information output from said detection means and for outputting an indicator signal when it is determined that there is a strong possibility of the collision; and
    passenger protecting means for taking measure to protect a passenger of said moving body when said indicator signal is output from said danger level determining means.

5. A system for supporting driving of a moving body comprising:
    imaging means installed on said moving body for taking a camera image of a surrounding region of said moving body;
    image generating means for converting said camera image of said imaging means into an image seen from a visual point positioned differently from said imaging means; and
    detecting means for detecting a distance from said moving body to an object imaged in said camera image,
    wherein said image generating means corrects distortion of an image of said object by using said distance detected by said detection means in converting said image.

6. The driving supporting system of claim 5,
    wherein said imaging means is plural in number,
    said plural imaging means have, in camera images thereof, an overlap area in which imaging areas of first imaging means and second imaging means overlap with each other, and
    said detection means obtains a stereo parallax between said first imaging means and said second imaging means in said overlap area, and obtains a distance to said object on the basis of said obtained stereo parallax.

7. The system for supporting driving of a moving body of claim 5,
    wherein said detection means obtains a distance to said object on the basis of flows corresponding to movement with time of said camera image.

8. A system for supporting driving of a moving body comprising:
    imaging means installed on said moving body for taking a camera image of a surrounding region of said moving body; and
    detection means for obtaining flows corresponding to movement with time on the basis of said camera image of said imaging means and for detecting movement of an object present in the surrounding region of said moving body on the basis of said flows,
    wherein said detection means obtains, as preparation for detecting the movement of said object, an offset estimated value from each of said obtained flows and cancels said offset estimated value from each of said flows as a vibration component derived from jolt of said moving body wherein a detection means detects flows corresponding to movement with time of an image in the imaging area of a first imaging means excluding a area, and detects movement of a object present in the rear of a moving body on the basis of a detected flows.

* * * * *

UNITED STATES PATENT AND TRADEMARK OFFICE
CERTIFICATE OF CORRECTION

PATENT NO. : 6,993,159 B1 Page 1 of 1
APPLICATION NO. : 10/088593
DATED : January 31, 2006
INVENTOR(S) : Hirofumi Ishii et al.

It is certified that error appears in the above-identified patent and that said Letters Patent is hereby corrected as shown below:

Title Page

Item (56), References Cited; FOREIGN PATENT DOCUMENTS,:

"JP    0940397    9/1997" should be --JP   9-240397   9/1997--

In the Claims:

Column 17

Line 50, Claim 3: "form" should be --from--

Column 18

Line 55, Claim 8: "excluding a area" should be --excluding an area--

Line 55, Claim 8: "of a object" should be --of an object--

Signed and Sealed this

Twenty-eighth Day of November, 2006

JON W. DUDAS
*Director of the United States Patent and Trademark Office*